(12) United States Patent
Hunt et al.

(10) Patent No.: US 10,730,641 B2
(45) Date of Patent: *Aug. 4, 2020

(54) FUSELAGE MANUFACTURING SYSTEM

(71) Applicant: The Boeing Company, Chicago, IL (US)

(72) Inventors: Jeffrey H. Hunt, Thousand Oaks, CA (US); Naveed Moayyed Hussain, Santa Monica, CA (US)

(73) Assignee: The Boeing Company, Chicago, IL (US)

( * ) Notice: Subject to any disclaimer, the term of this patent is extended or adjusted under 35 U.S.C. 154(b) by 499 days.

This patent is subject to a terminal disclaimer.

(21) Appl. No.: 15/593,319

(22) Filed: May 11, 2017

(65) Prior Publication Data

US 2017/0247122 A1     Aug. 31, 2017

Related U.S. Application Data

(63) Continuation of application No. 14/717,272, filed on May 20, 2015, now Pat. No. 9,682,788, which is a
(Continued)

(51) Int. Cl.
*B64F 5/10* (2017.01)
*G01B 11/25* (2006.01)
(Continued)

(52) U.S. Cl.
CPC .............. *B64F 5/10* (2017.01); *B21D 31/005* (2013.01); *B21D 53/92* (2013.01); *B23P 19/10* (2013.01);
(Continued)

(58) Field of Classification Search
CPC .......... B64F 5/0009; B64F 5/10; B21D 53/92; B21D 31/005; B64C 1/069; B23P 19/10;
(Continued)

(56) References Cited

U.S. PATENT DOCUMENTS 2,800,867 A    7/1957  Ross
4,527,783 A    7/1985  Collora et al.
(Continued)

FOREIGN PATENT DOCUMENTS

CA    2851556 A1    4/2013
EP    2756934 A1 *  7/2014   ............ B25J 9/1687
(Continued)

OTHER PUBLICATIONS

Machine translation of JP 58-135727, Translated Jul. 11, 2019. 9 Pages. (Year: 1983).*

(Continued)

*Primary Examiner* — Gregory D Swiatocha
(74) *Attorney, Agent, or Firm* — Yee & Associates, P.C.

(57) ABSTRACT

A method and apparatus for processing fuselage sections. A first fuselage section is held in a cradle system. A current shape of the first fuselage section in the cradle system is measured. Forces to change the current shape of the first fuselage section to a desired shape for connecting the first fuselage section to a second fuselage section are identified. The forces identified are applied using a system to change the current shape of the first fuselage section towards the desired shape.

20 Claims, 22 Drawing Sheets

Related U.S. Application Data continuation-in-part of application No. 14/488,984, filed on Sep. 17, 2014.

(51) Int. Cl.
| | |
|---|---|
| *B21D 31/00* | (2006.01) |
| *B23P 19/10* | (2006.01) |
| *B21D 53/92* | (2006.01) |
| *B64C 1/06* | (2006.01) |
| *B25J 5/00* | (2006.01) |
| *G01S 17/89* | (2020.01) |
| *G01S 17/66* | (2006.01) |

(52) U.S. Cl.
CPC ............. *B25J 5/007* (2013.01); *B64C 1/069* (2013.01); *G01B 11/2518* (2013.01); *B23P 2700/01* (2013.01); *G01S 17/66* (2013.01); *G01S 17/89* (2013.01)

(58) Field of Classification Search
CPC ... B23P 19/102; B23P 19/105; B23P 2700/01; B21B 19/02; B25J 5/05; B25J 5/005; Y10S 901/44
USPC .................................. 72/292; 269/254 MW
See application file for complete search history.

(56) References Cited

U.S. PATENT DOCUMENTS

| | | | |
|---|---|---|---|
| 5,364,083 A | 11/1994 | Ross et al. | |
| 5,371,587 A | 12/1994 | De Groot et al. | |
| 7,215,413 B2 | 5/2007 | Soreide et al. | |
| 7,307,700 B1 | 12/2007 | Leep et al. | |
| 7,387,475 B2 * | 6/2008 | Beggs ...................... | B23Q 9/02 408/76 |
| 7,430,070 B2 | 9/2008 | Soreide et al. | |
| 7,444,742 B2 * | 11/2008 | Sturm, Jr. .............. | B23Q 1/035 29/712 |
| 7,701,592 B2 | 4/2010 | Saint Clair et al. | |
| 7,903,261 B2 | 3/2011 | Saint Clair et al. | |
| 8,322,700 B2 | 12/2012 | Saberton et al. | |
| 9,453,720 B2 | 9/2016 | Hunt et al. | |
| 9,682,788 B2 * | 6/2017 | Hunt ................... | G01B 11/2518 |
| 2009/0266936 A1 | 10/2009 | Fernandez et al. | |
| 2010/0135754 A1 | 6/2010 | Weber | |
| 2011/0190941 A1 | 8/2011 | Marsh et al. | |
| 2012/0130528 A1 * | 5/2012 | Stark ....................... | B23P 19/10 700/114 |
| 2014/0288895 A1 | 9/2014 | Fricero et al. | |
| 2015/0273696 A1 * | 10/2015 | Nam ..................... | B25J 19/005 700/259 |
| 2016/0074926 A1 | 3/2016 | Hunt et al. | |
| 2016/0075450 A1 | 3/2016 | Hunt et al. | |
| 2016/0075451 A1 | 3/2016 | Hunt et al. | |
| 2016/0076879 A1 | 3/2016 | Hunt et al. | |
| 2017/0015440 A1 | 1/2017 | Hunt et al. | |

FOREIGN PATENT DOCUMENTS

| | | | | |
|---|---|---|---|---|
| EP | 2756934 A1 | 7/2014 | | |
| EP | 2979810 A1 | 2/2016 | | |
| JP | 58135727 A | * 8/1983 | ............ | B21D 43/12 |
| JP | 2006051557 A | 2/2006 | | |
| JP | 2012525266 A | 10/2012 | | |
| WO | WO2014156745 A1 | 10/2014 | | |

OTHER PUBLICATIONS

Final Office Action, dated Mar. 28, 2019, regarding U.S. Appl. No. 14/489,101, 12 pages.
Extended European Search Report, dated Jan. 29, 2016, regarding Application No. EP15182797.9, 8 pages.
Office Action, dated Sep. 30, 2016, regarding U.S. Appl. No. 14/488,984, 38 pages.
Final Office Action, dated Mar. 2, 2017, regarding U.S. Appl. No. 14/488,984, 19 pages.
Office Action, dated Sep. 25, 2015 regarding U.S. Appl. No. 14/489,057, 14 pages.
Final Office Action, dated Feb. 2, 2016 regarding U.S. Appl. No. 14/489,057, 11 pages.
Notice of Allowance, dated May 25, 2016 regarding U.S. Appl. No. 14/489,057, 11 pages.
Office Action, dated Oct. 3, 2016, regarding U.S. Appl. No. 14/717,272, 34 pages.
Notice of Allowance, dated Feb. 14, 2017, regarding U.S. Appl. No. 14/717,272, 13 pages.
Office Action, dated Oct. 19, 2017, regarding U.S. Appl. No. 14/488,984, 22 pages.
Office Action, dated Oct. 19, 2017, regarding U.S. Appl. No. 14/489,101, 44 pages.
Notice of Allowance, dated Nov. 20, 2017, regarding U.S. Appl. No. 15/276,746. 27 pages.
Final Office Action, dated Jun. 14, 2018, regarding U.S. Appl. No. 14/489,101, 20 pages.
Office Action, dated Nov. 29, 2018, regarding U.S. Appl. No. 14/489,101, 12 pages.
Final Office Action, dated Jan. 30, 2019, regarding U.S. Appl. No. 14/488,984, 27 pages.
Japanese Patent Office Notification of Reasons for Rejection and English Translation, dated Aug. 17, 2018, regarding Application No. 2015173613, 10 pages.
Office Action, dated Oct. 4, 2018, regarding U.S. Appl. No. 14/488,984, 34 pages.
China National Intellectual Property Administration First Notification of Office Action and English Translation, dated Nov. 1, 2018, regarding Application No. 201510592041.9, 13 pages.
Final Office Action, dated Mar. 15, 2018, regarding U.S. Appl. No. 14/488,984, 35 pages.
"Leica Absolute Tracker AT401", Leica Geo Systems, dated Nov. 16, 2010, 1 page. http://metrology.leicageosystems.com:80/en/LeicaAbsoluteTrackerAT 401 81625.htm.
"Reflective Tape Targets", Leica Geo Systems, May 12, 2010, 1 page. http://metrology.leicageosystems.com/en/ReflectiveTapeTargets_7460.htm.

* cited by examiner

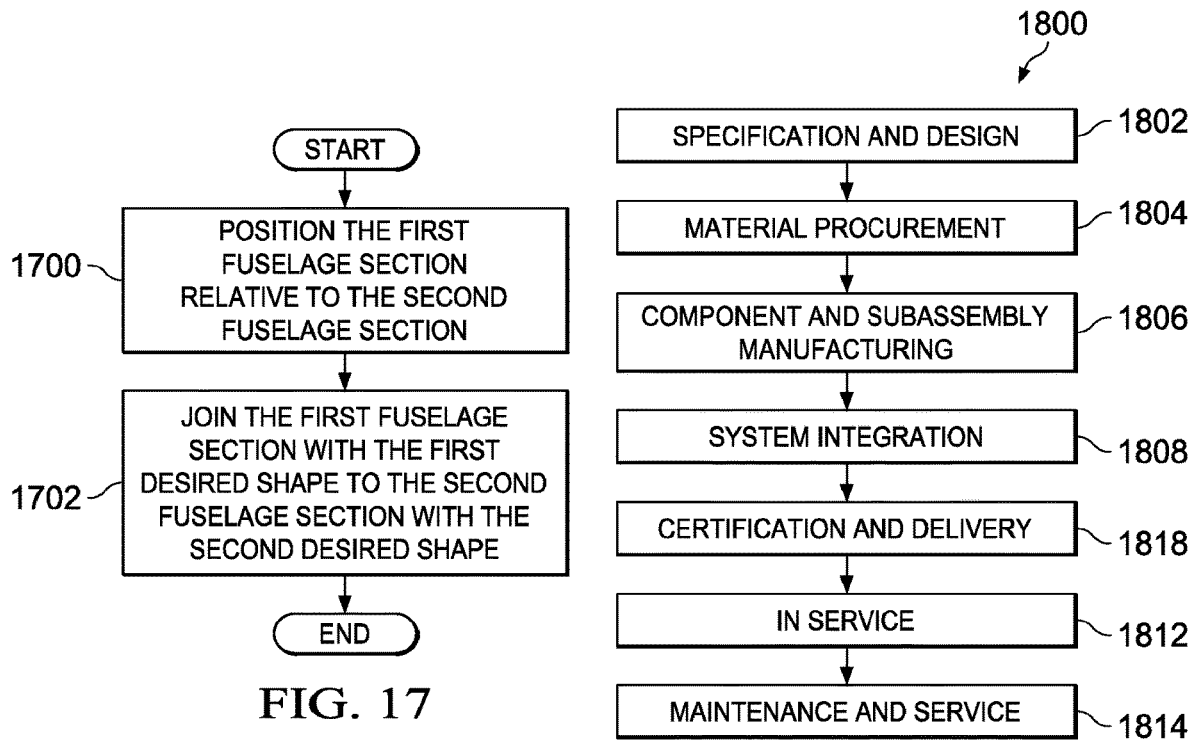
FIG. 17
FIG. 18
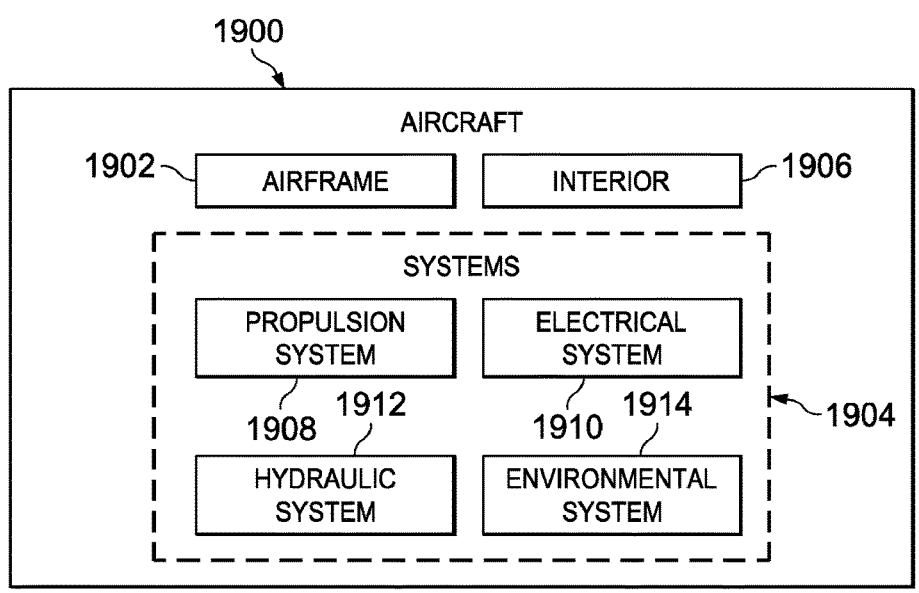
FIG. 19

FUSELAGE MANUFACTURING SYSTEM

CROSS-REFERENCE TO RELATED APPLICATIONS

This application is a continuation application of U.S. patent application Ser. No. 14/717,272, filed on May 20, 2015, now U.S. Pat. No. 9,682,788, issued Jun. 20, 2017 which is a continuation in part of U.S. patent application Ser. No. 14/488,984, filed on Sep. 17, 2014, which is related to the following patent applications: U.S. patent application Ser. No. 14/489,101, filed on Sep. 17, 2014, and U.S. patent application Ser. No. 14/489,057, filed on Sep. 17, 2014, now U.S. Pat. No. 9,453,720 issued Sep. 27, 2016. Each of the aforementioned applications is incorporated herein by reference in its entirety.

BACKGROUND INFORMATION

1. Field

The present disclosure relates generally to manufacturing objects and, in particular, to manufacturing aircraft. Still more particularly, the present disclosure relates to a method and apparatus for joining composite fuselage sections to each other.

2. Background

Aircraft are being designed and manufactured with greater and greater percentages of composite materials. Composite materials are used in aircraft to decrease the weight of the aircraft. This decreased weight improves performance features such as payload capacities and fuel efficiencies. Further, composite materials provide longer service life for various components in an aircraft.

Composite materials are tough, light-weight materials created by combining two or more functional components. For example, a composite material may include reinforcing fibers bound in polymer resin matrix. The fibers may be unidirectional or may take the form of a woven cloth or fabric. The fibers and resins are arranged and cured to form a composite material.

Further, using composite materials to create aerospace composite structures potentially allows for portions of an aircraft to be manufactured in larger pieces or sections. For example, a fuselage in an aircraft may be created in cylindrical sections and then assembled to form the fuselage of the aircraft. Other examples include, without limitation, wing sections joined to form a wing, or stabilizer sections joined to form a stabilizer.

With fuselage sections that are cylindrical, the dimensions of the fuselage sections are important to provide a desired fit when joining these sections to each other to form the fuselage of the aircraft. For example, the ends of two fuselage sections are joined to form part of the fuselage of the aircraft. The shape of these ends should match as closely as possible.

A difference in the shapes of the ends may result in an undesired fit. Differences in the shapes of the ends may result from different causes. For example, variations from design specification in manufacturing the fuselage sections may cause an undesired shape at the ends. The fuselage sections are large enough that gravity may cause deformation that changes the shape of the fuselage sections such that the ends do not have a desired shape to be joined to each other.

This undesired fit may cause the fuselage of the aircraft to perform in a less than desired manner. For example, if the fuselage sections are joined with the undesired shapes, the amount of fuel used may increase from undesired airflow that may occur during flight. Also, undesired airflow may cause increased noise that may reduce pleasantness of the flight experience for passengers.

Currently, operators on the manufacturing floor move ends of the two fuselage sections next to each other for joining. The operators measure the differences in the shape of the ends using tools such as feeler gauges. Changes to the shape of one or both fuselage ends are made using jacks or other tools placed and operated by the operators to push on the fuselage sections to change the shape of one or both of the fuselage sections.

The currently used process for joining the fuselage sections is time consuming and labor intensive. Additionally, the shapes of the two fuselage sections may be close but may still not have a desired level of fit between them.

Therefore, it would be desirable to have a method and apparatus that take into account at least some of the issues discussed above, as well as other possible issues. For example, it would be advantageous to have a method and apparatus for joining fuselage sections for an aircraft with a desired level of fit.

SUMMARY

In one illustrative embodiment, an apparatus comprises a cradle system, a system, a metrology system, and a controller. The cradle system holds a first fuselage section. The system applies forces to the first fuselage section to change a current shape of the first fuselage section. The metrology system makes measurements of the current shape of the first fuselage section. The controller receives the measurements from the metrology system, identifies the forces to change the current shape of the first fuselage section towards a desired shape for connecting the first fuselage section to a second fuselage section, and sends commands to the system to apply the forces to change the current shape of the first fuselage section towards the desired shape A further illustrative embodiment of the present disclosure provides a method for processing fuselage sections. A first fuselage section is held in a cradle system. A current shape of the first fuselage section in the cradle system is measured. Forces to change the current shape of the first fuselage section to a desired shape for connecting the first fuselage section to a second fuselage section are identified. The forces identified are applied using a system to change the current shape of the first fuselage section towards the desired shape.

A yet further illustrative embodiment of the present disclosure provides an apparatus. The apparatus comprises a system, an optical metrology system, and a controller. The system applies forces to a structure to change a current shape of the structure. The optical metrology system makes measurements of the current shape of the structure. The controller receives the measurements from the metrology system, identifies the forces to change the current shape of the structure to a desired shape for connecting the structure to another structure with a desired fit, and sends commands to the cradle system to apply the forces to change the current shape of the structure towards the desired shape.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 17 is an illustration of a flowchart of a process for joining fuselage sections in accordance with an illustrative embodiment;

FIG. 18 is an illustration of an aircraft manufacturing and service method in the form of a block diagram in accordance with an illustrative embodiment;

FIG. 19 is an illustration of an aircraft in the form of a block diagram in which an illustrative embodiment may be implemented;

DETAILED DESCRIPTION

Figure 1:
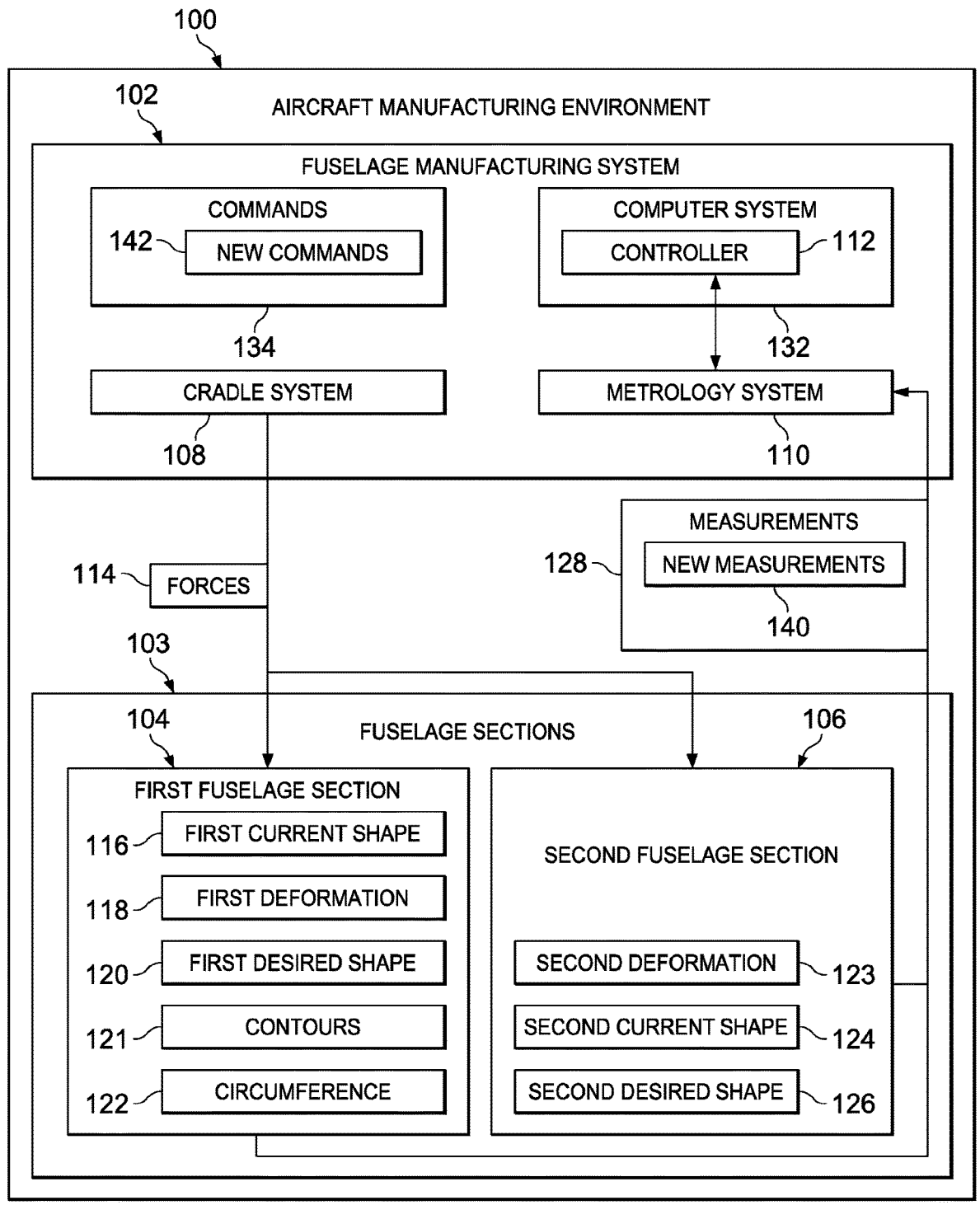
FIG. 1 is an illustration of a block diagram of an aircraft manufacturing environment in accordance with an illustrative embodiment.

With reference now to the figures, and in particular, with reference to FIG. 1, an illustration of a block diagram of an aircraft manufacturing environment is depicted in accordance with an illustrative embodiment. In this example, aircraft manufacturing environment 100 includes fuselage manufacturing system 102, which is used to join fuselage sections 103 to each other as part of manufacturing an aircraft.

In this illustrate example, fuselage manufacturing system 102 joins first fuselage section 104 to second fuselage section 106 in fuselage sections 103 using a number of components. As depicted, components in fuselage manufacturing system 102 include cradle system 108, metrology system 110, and controller 112.

Cradle system 108 is a physical apparatus. As depicted, cradle system 108 holds first fuselage section 104 and applies forces 114 to first fuselage section 104 to change first current shape 116 of first fuselage section 104.

The application of forces 114 by cradle system 108 to first fuselage section 104 causes first deformation 118 to first fuselage section 104. Forces 114 may be applied in a manner that causes first deformation 118 such that first current shape 116 of first fuselage section 104 changes towards first desired shape 120 for first fuselage section 104.

In this illustrative example, first current shape 116 and first desired shape 120 are contours 121 for first fuselage section 104. In particular, the contours are those around circumference 122 of first fuselage section 104.

Additionally, a portion of forces 114 generated by cradle system 108 also may be applied to second fuselage section 106. Cradle system 108 applies forces 114 in a manner that causes second deformation 123. As a result, second current shape 124 of second fuselage section 106 has second deformation 123 and second current shape 124 changes towards second desired shape 126 for second fuselage section 106.

In other words, cradle system 108 may apply forces 114 to change at least one of first current shape 116 of first fuselage section 104 towards first desired shape 120 or second current shape 124 of second fuselage section 106 towards second desired shape 126. As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, metrology system 110 is a hardware sensor system. Metrology system 110 makes measurements 128 of fuselage sections 103. As depicted, measurements 128 are made without contact or touching fuselage sections 103.

For example, metrology system 110 makes measurements 128 of first current shape 116 of first fuselage section 104. Metrology system 110 also may make measurements 128 of second current shape 124 of second fuselage section 106.

In the illustrative example, controller 112 controls operation of cradle system 108 and metrology system 110. Controller 112 may be implemented in software, hardware, firmware or a combination thereof. When software is used, the operations performed by controller 112 may be implemented in program code configured to run on hardware, such as a processor unit. When firmware is used, the operations performed by controller 112 may be implemented in program code and data and stored in persistent memory to run on a processor unit. When hardware is employed, the hardware may include circuits that operate to perform the operations in controller 112.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In this illustrative example, controller 112 is located in computer system 132. Computer system 132 includes one or more data processing systems. When more than one data processing system is present, those data processing systems may be in communication with each other using a communications medium such as a network. The data processing systems may be selected from at least one of a computer, a server computer, a tablet, a mobile phone, or some other suitable data processing system.

As depicted in this illustrative example, controller 112 receives measurements 128 from metrology system 110. Controller 112 identifies forces 114 needed to change first current shape 116 of first fuselage section 104 to first desired shape 120 for connecting first fuselage section 104 to second fuselage section 106. Controller 112 then sends commands 134 to cradle system 108 to apply forces 114 to change first current shape 116 of first fuselage section 104 towards first desired shape 120.

When forces 114 are applied to first fuselage section 104, the change in first current shape 116 may not result in first desired shape 120. Instead, first current shape 116 may be closer to first desired shape 120 but not quite reaching first desired shape 120.

In this case, measurements 128 may be made again by metrology system 110. In this illustrative example, measurements 128 are new measurements 140 made by metrology system 110 after cradle system 108 applies forces 114 to first fuselage section 104 to change first current shape 116 of first fuselage section 104 towards first desired shape 120.

Controller 112 uses new measurements 140 as a feedback to identify forces 114 needed to change first current shape 116 of first fuselage section 104 further towards first desired shape 120 if first desired shape 120 has not been reached. Controller 112 sends commands 134 in the form of new commands 142 to cradle system 108 to apply forces 114 to change first current shape 116 of first fuselage section 104 towards first desired shape 126.

Further, measurements 128 from metrology system 110 may include measurements for second fuselage section 106. In this particular example, controller 112 identifies forces 114 needed to change second current shape 124 of second fuselage section 106 towards second desired shape 126 for connecting first fuselage section 104 to second fuselage section 106. Controller 112 then sends commands 134 to cradle system 108 causing cradle system 108 to apply forces 114 to change second current shape 124 of second fuselage section 106 towards second desired shape 126.

In the illustrative example, first desired shape 120 is based on at least one of second current shape 124 of second fuselage section 106, a model of first fuselage section 104, parameters specified by a design for first fuselage section 104, or some other standard or specification. For example, first desired shape 120 for first fuselage section 104 may be second current shape 124 for second fuselage section 106. In another example, second desired shape 126 for second fuselage section 106 may be first current shape 116 for first fuselage section 104.

In this manner, fuselage sections 103 may be joined to each other in a desired manner more efficiently than with currently used techniques. With fuselage manufacturing system 102, the amount of time and labor needed to join fuselage sections 103 to each other may be reduced. Further, a desired level of fit between first fuselage section 104 and second fuselage section 106 may be achieved with less effort or time. In this manner, the time and expense needed to manufacture a fuselage may be reduced as well as provide for a desired level of fit between fuselage sections 103.

Figure 2:
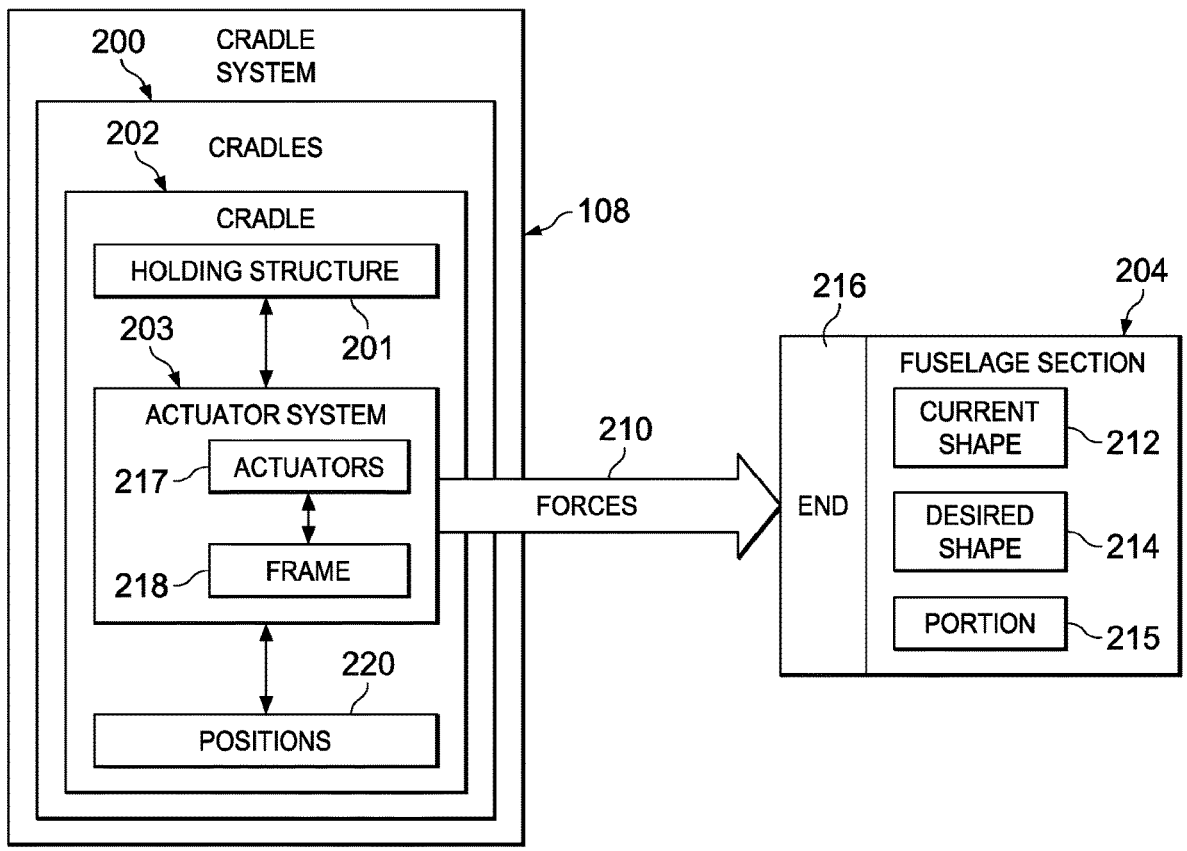
FIG. 2 is an illustration of a block diagram of a cradle system in accordance with an illustrative embodiment.

With reference next to FIG. 2, an illustration of a block diagram of a cradle system is depicted in accordance with an illustrative embodiment. As depicted, an example of an implementation for cradle system 108 in FIG. 1 is depicted. In this illustrative example, cradle system 108 includes a group of cradles 200. As used herein, a "group of," when used with reference items means one or more items. For example, a group of cradles 200 is one or more of cradles 200.

In this example, cradle 202 in the group of cradles 200 includes a number of components. As depicted, holding structure 201 and actuator system 203 are components that form cradle 202. As depicted, cradle 202 is mobile. In other words, cradle 202 is configured to move within aircraft manufacturing environment 100 in FIG. 1. For example, cradle 202 may be movable by a human operator, a vehicle, or may include a movement system.

Holding structure 201 holds fuselage section 204. Fuselage section 204 is an example of a fuselage section in fuselage sections 103 in FIG. 1. In this illustrative example, actuator system 203 applies forces 210 to fuselage section 204 while fuselage section 204 is held in holding structure 201. Forces 210 change current shape 212 of fuselage section 204 towards desired shape 214 when commands 134 are received from controller 112 in FIG. 1.

In the depicted example, actuator system 203 may apply forces 210 to portion 215 of fuselage section 204 to change current shape 212 of fuselage section 204. Portion 215 may be some or all of fuselage section 204 depending on the particular implementation. For example, portion 215 may be about one half of a circumference of the fuselage section. As another example, actuator system 203 applies forces 210 to portion 215 of fuselage section 204 located at end 216 of fuselage section 204.

As depicted, actuator system 203 is formed from a number of different components. As depicted, components in actuator system 203 include actuators 217 and frame 218.

In this illustrative example, actuators 217 may be implemented using one or more different types of actuators. For example, actuators 217 may be selected from at least one of a linear actuator, a hydraulic actuator, a pneumatic actuator, an electro mechanical actuator, or some other suitable type of actuator.

As depicted, frame 218 is a structure that holds actuators 217. In particular, actuators 217 are physically associated with frame 218. When one component is "associated" with another component, the association is a physical association in the depicted examples. For example, a first component may be considered to be physically associated with a second component by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

In this illustrative example, frame 218 holds actuators 217 in positions 220 around fuselage section 204 when fuselage section 204 is held in holding structure 201 in cradle 202. For example, frame 218 may hold actuators 217 such that actuators 217 are positioned at end 216 of fuselage section 204 held in holding structure 201.

Figure 3:
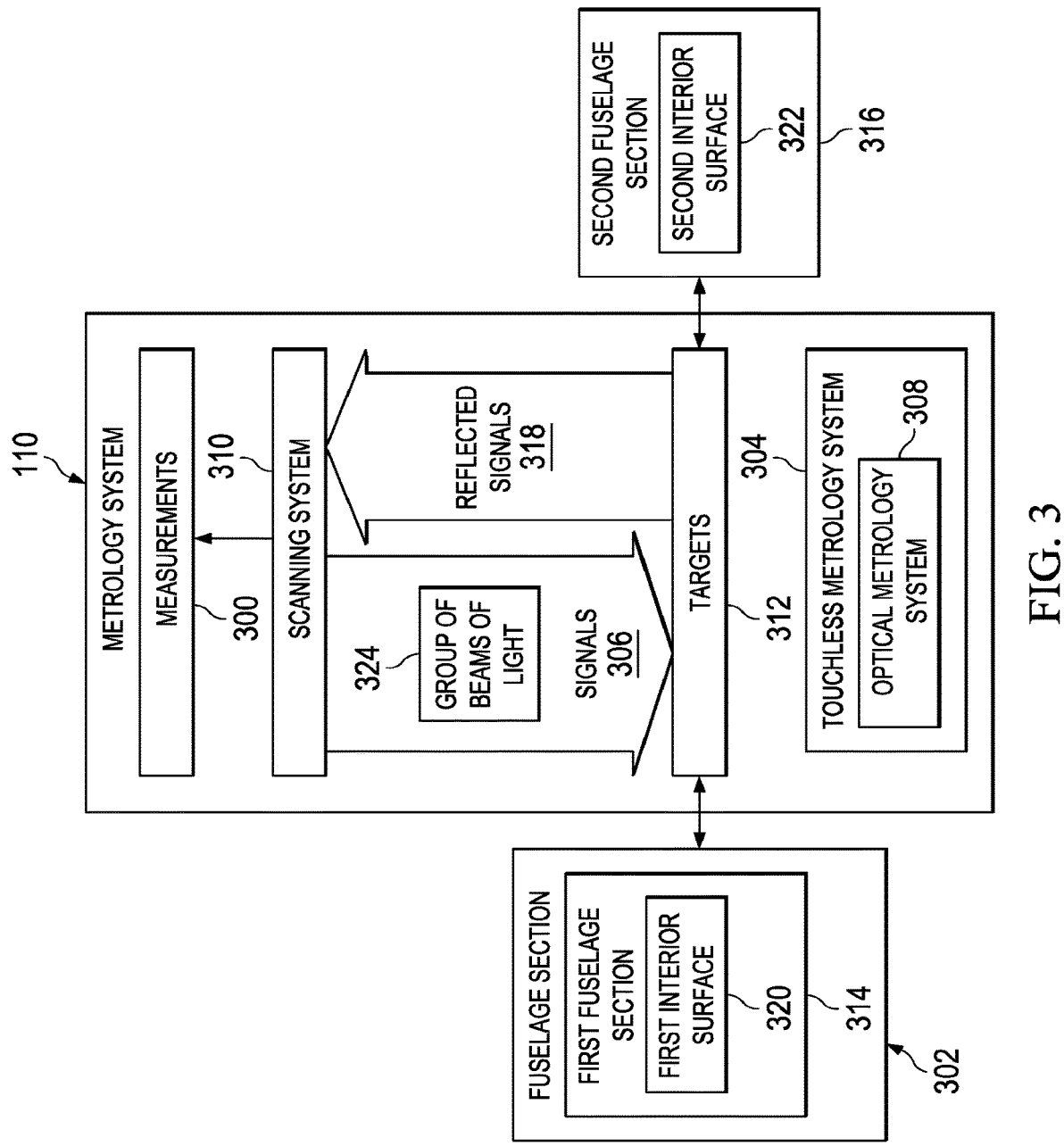
FIG. 3 is an illustration of a block diagram of a metrology system in accordance with an illustrative embodiment.

With reference next to FIG. 3, an illustration of a block diagram of a metrology system is depicted in accordance with an illustrative embodiment. As depicted, an example of an implementation for metrology system 110 in FIG. 1 is depicted.

In this illustrative example, metrology system 110 makes measurements 300 of fuselage section 302. Fuselage section 302 is an example of a fuselage section in fuselage sections 103 in FIG. 1. Measurements 300 are examples of measurements 128 in FIG. 1.

As depicted, metrology system 110 is touchless metrology system 304. In other words, metrology system 110 does not require physical contact with fuselage section 302 to generate measurements 300.

Instead, metrology system 110 may use signals 306 to generate measurements 300. As depicted, signals 306 may include at least one of light, infrared signals, radio frequency signals, or other suitable types of signals. In this illustrative example, touchless metrology system 304 takes the form of optical metrology system 308.

Metrology system 110 includes a number of different components. In this particular example, metrology system 110 includes scanning system 310 and targets 312.

As depicted, scanning system 310 transmits signals 306 to generate measurements 300. In this illustrative example, scanning system 310 includes at least one of a lidar system, a laser scanning system, or some other suitable type of device. In other words, one or more of these devices or other suitable devices may be used in any combination in scanning system 310.

Scanning system 310 may be selected such that scanning system 310 may transmit signals 306, detect reflected signals 318, or both in about 360 degrees. The detection may be performed without moving, realigning, or otherwise changing the position of scanning system 310 while transmitting signals 306 or detecting reflected signals 318.

In other words, metrology system 110 with scanning system 310 and targets 312 is self-referencing. In being self-referencing, absolute positioning is not needed to obtain a desired resolution in generating measurements 300. The desired resolution may be obtained without any dependency on an absolute positioning of scanning system 310, targets 312, or both.

Targets 312 are structures that reflect signals 306. Reflected signals 318 are detected by scanning system 310 and are used to generate measurements 300. Targets 312 may be selected from at least one of reflective tape, a tooling ball, a feature on fuselage section 302, or some other suitable target. In other words, targets 312 may be attached to fuselage section 302, already present as part of fuselage section 302 as manufactured, or some combination thereof.

Using features in fuselage section 302 reduces the time and effort needed to shape and join fuselage section 302 to other structures. For example, attaching and removing targets is unnecessary. Also, inspecting fuselage section 302 for debris, inconsistencies in fuselage section 302 from targets 312 is avoided. The feature may be any structure or portion of fuselage section 302 that reflects signals 306.

In this illustrative example, metrology system 110 may be used to generate measurements of two fuselage sections. For example, fuselage section 302 is first fuselage section 314 and scanning system 310 may be positioned relative to first fuselage section 314 and second fuselage section 316. These two fuselage sections may be held in cradle system 108 in FIG. 1. For example, scanning system 310 may be positioned between first fuselage section 314 and second fuselage section 316.

Targets 312 are located on both first fuselage section 314 and second fuselage section 316 in this illustrative example. In particular, targets 312 may be located on first interior surface 320 of first fuselage section 314 and second interior surface 322 of second fuselage section 316.

Scanning system 310 transmits signals 306 at targets 312 on first fuselage section 314 and second fuselage section 316. Reflected signals 318 from targets 312 are detected by scanning system 310. As depicted, scanning system 310 generates measurements 300 from reflected signals 318 from both first fuselage section 314 and second fuselage section 316. When both first fuselage section 314 and second fuselage section 316 are present instead of just first fuselage section 314, the positioning of scanning system 310 is selected such that scanning system 310 is able to direct signals 306 to targets 312 on both first fuselage section 314 and second fuselage section 316 at substantially the same time.

In the illustrative example, signals 306 may be a group of beams of light 324. In on illustrative example, the group of beams of light 324 may be group of laser beams. If a single laser beam is used, scanning system 310 may use a mirror or other reflector to direct the laser beam to targets 312 on first fuselage section 314 and second fuselage section 316 at substantially the same time.

In the illustrative example, metrology system 110 may operate on its own. In other words, measurements 300 may be made without needed input or changes from a human operator or some other device. Scanning system 310 may receive a program, control file, or other information and operate to perform measurements 300. Measurements 300 may be performed each time metrology system 110 detects an event.

For example, measurements 300 may be performed each time metrology system 110 detects a change in the shape of at least one of first fuselage section 314 or second fuselage section 316. Scanning system 310 may transmit signal continuously or periodically to detect when the shape of at least one of first fuselage section 314 or second fuselage section 316 changes.

Figure 4:
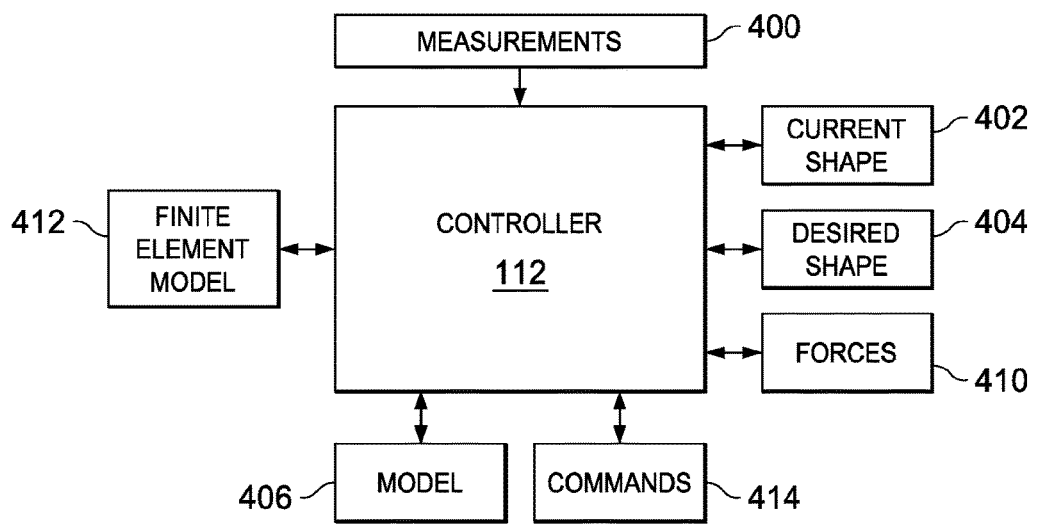
FIG. 4 is an illustration of a block diagram of data flow for identifying forces to be applied to a fuselage section in accordance with an illustrative embodiment.

With reference to FIG. 4, an illustration of a block diagram of data flow for identifying forces to be applied to a fuselage section is depicted in accordance with an illustrative embodiment. In this depicted example, controller 112 identifies forces 114 to be applied to a fuselage section, such as first fuselage section 104 shown in FIG. 1.

As depicted, controller 112 receives measurements 400 for a fuselage section. Measurements 400 is an example of measurements 128 in FIG. 1. Controller 112 uses measurements 400 to identify current shape 402 for a fuselage section. Controller 112 then identifies desired shape 404.

In these illustrative examples, desired shape 404 may be identified from model 406. Model 406 may be a model of the fuselage section with the desired dimensions. In this illustrative example, model 406 is a computer-aided design model. In another illustrative example, desired shape 404 may be identified from current shape 402 for a second fuselage section to which the fuselage section being processed is to be joined.

The process then identifies forces 410 to be applied to the fuselage section. These forces may be identified using a number of different techniques. For example, finite element model 412 for the fuselage section may be used to identify how different forces affect current shape 402 for the fuselage section being processed. Based on the identification of forces 410, controller 112 generates commands 414 that are sent to a cradle holding the fuselage section to apply forces 410 as identified by controller 112.

Figure 5:
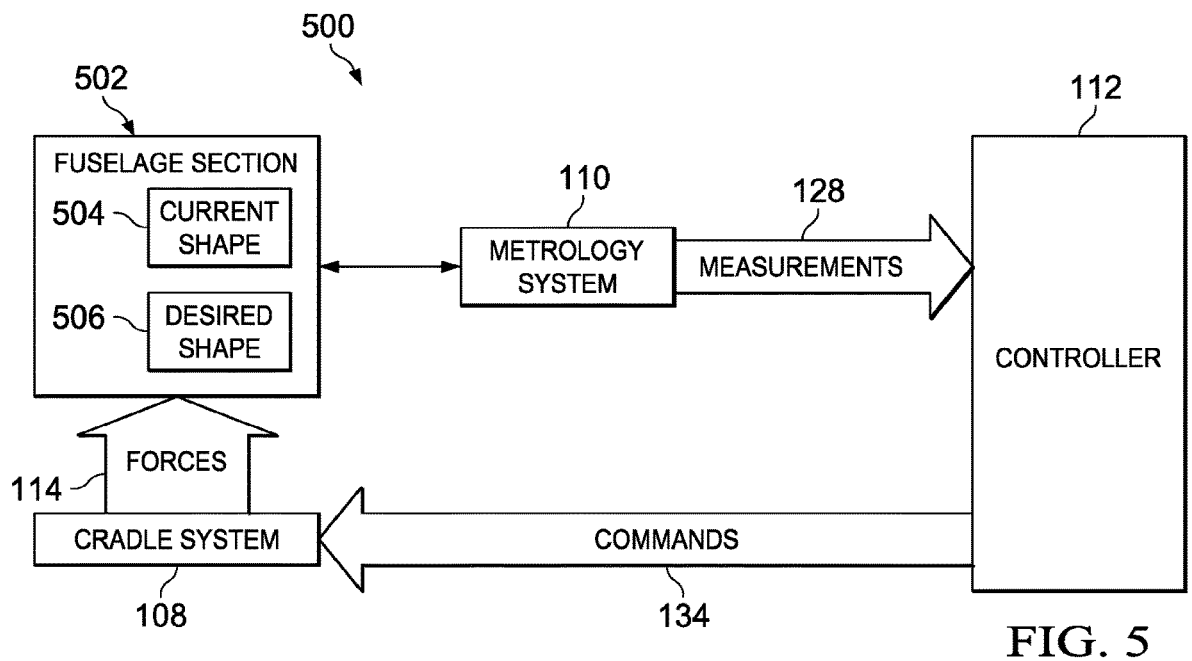
FIG. 5 is an illustration of a feedback loop in accordance with an illustrative embodiment.

With reference now to FIG. 5, an illustration of a feedback loop is depicted in accordance with an illustrative embodiment. In this depicted example, feedback loop 500 is formed by cradle system 108, metrology system 110 and controller 112.

As depicted, metrology system 110 generates measurements 128 of fuselage section 502 held in cradle system 108. In this illustrative example, fuselage section 502 is a fuselage section in fuselage sections 103 in FIG. 1.

Measurements 128 are sent by metrology system 110 to controller 112. In turn, controller 112 uses measurements 128 to identify forces 114. Forces 114 are ones that should be applied to fuselage section 502 to change current shape 504 of fuselage section 502 towards desired shape 506 for fuselage section 502.

In the illustrative example, controller 112 generates commands 134 and sends commands 134 to cradle system 108. In turn, cradle system 108 applies forces 114 to fuselage section 502. Changing current shape 504 of fuselage section 502 towards desired shape 506 may mean that current shape 504 may reach desired shape 506 or that current shape 504 is closer to but does not reach desired shape 506 in the illustrative examples.

Metrology system 110 again generates measurements 128 after forces 114 have been applied. Measurements 128 are sent to controller 112 to form feedback loop 500. Feedback loop 500 is a closed loop that allows for incremental changes in current shape 504 in reaching desired shape 506.

In some cases, current shape 504 may reach desired shape 506 after the first application of forces 114 to fuselage section 502. In these cases, additional applications of forces 114 may be performed using feedback loop 500 until desired shape 506 has been reached.

In this illustrative example, measurements 128 is a measurement of current shape 504. Controller 112 compares measurements 128 for current shape 504 to parameters for desired shape 506 in determining whether forces 114 should be applied to fuselage section 502. In other illustrative examples, measurements 128 may be, for example, a difference between current shape 504 and desired shape 506 for fuselage section 502.

The illustration of aircraft manufacturing environment 100 and the different components in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, at least one of metrology system 110 or controller 112 identifies a difference between first current shape 116 of first fuselage section 104 and first desired shape 120 for first fuselage section 104. In yet another illustrative example, other numbers of fuselage sections may be processed in cradle system 108 in addition to or in place of first fuselage section 104 and second fuselage section 106. For example, one, three, six, or some other number of fuselage sections 103 may be held and shaped in cradle system 108 with forces 114 applied to change the current shapes of one or more of fuselage sections 103 held in cradle system 108.

Figure 6:
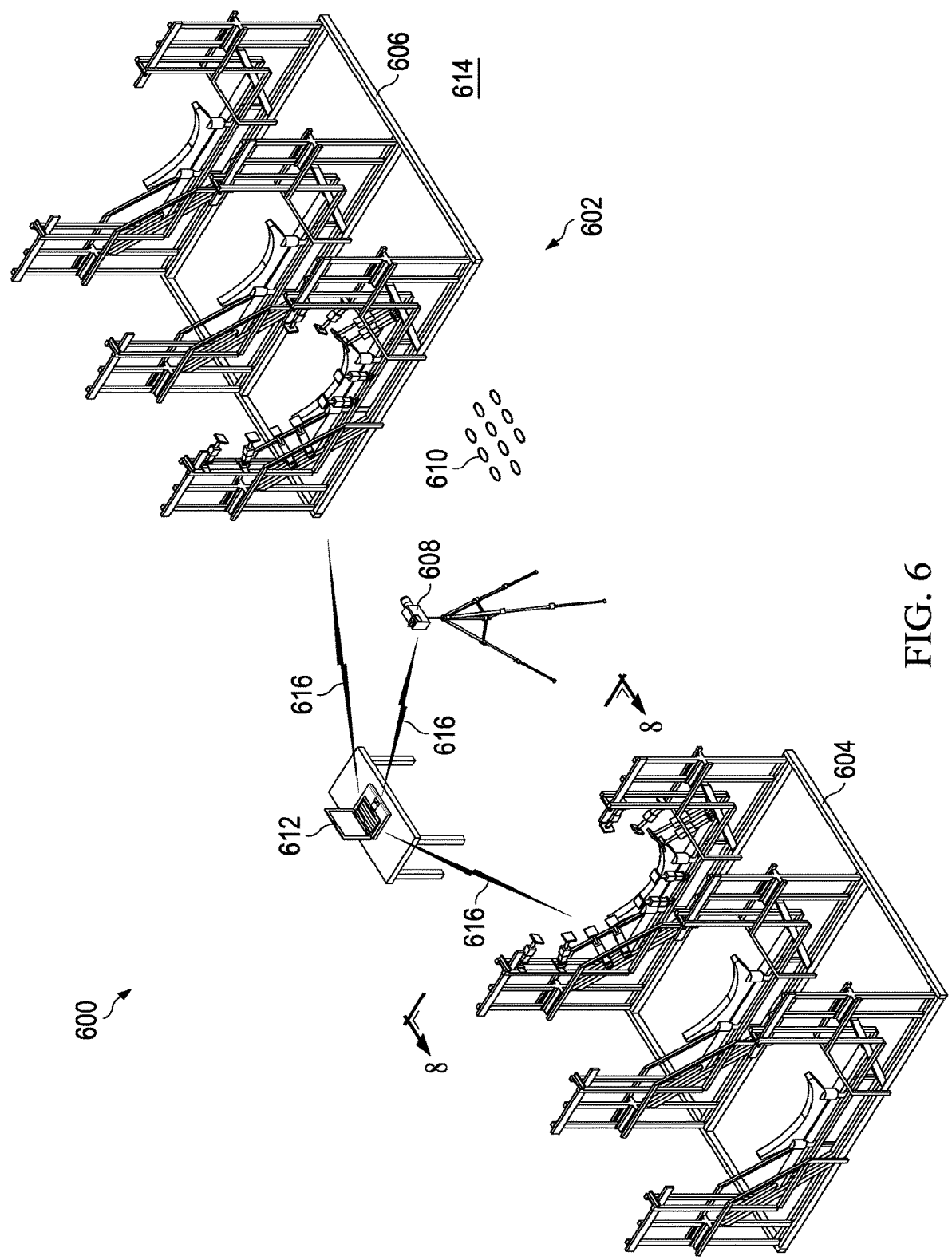
FIG. 6 is an illustration of an aircraft manufacturing environment in accordance with an illustrative embodiment.

With reference now to FIG. 6, an illustration of an aircraft manufacturing environment is depicted in accordance with an illustrative embodiment. Aircraft manufacturing environment 600 is an example of one physical implementation of aircraft manufacturing environment 100 shown in block form in FIG. 1.

In this illustrative example, fuselage manufacturing system 602 in aircraft manufacturing environment 600 includes a number of different components. As depicted, the components in aircraft manufacturing environment 600 include first cradle 604, second cradle 606, laser tracker 608, targets 610, and computer 612. These components are examples of physical components for components shown in block form in fuselage manufacturing system 102 in FIG. 1-4.

First cradle 604 and second cradle 606 form a cradle system in this illustrative example. First cradle 604 and second cradle 606 are examples of physical implementations for cradles 200 in cradle system 108 shown in block form in FIG. 2.

Laser tracker 608 and targets 610 are part of a metrology system. Laser tracker 608 is an example of a physical implementation for scanning system 310 in metrology system 110 as shown in FIG. 3.

In this illustrative example, targets 610 are located on floor 614 of aircraft manufacturing environment 600. Targets 610 may be placed on fuselage sections or other structures (not shown) and used by laser tracker 608 generating measurements. As depicted, targets 610 are examples of physical implementations for targets 312 shown in block form in FIG. 3.

Computer 612 is a controller for fuselage manufacturing system 602. Computer 612 is an example of a physical implementation for controller 112 in FIG. 1. In particular, computer 612 may be used to implement a computer in computer system 132 shown in block form in FIG. 1.

As depicted, computer 612 is in communication with first cradle 604, second cradle 606, and laser tracker 608. In this particular example, the communication between these components occurs through a communications medium that includes the use of wireless signals 616.

Figure 7:
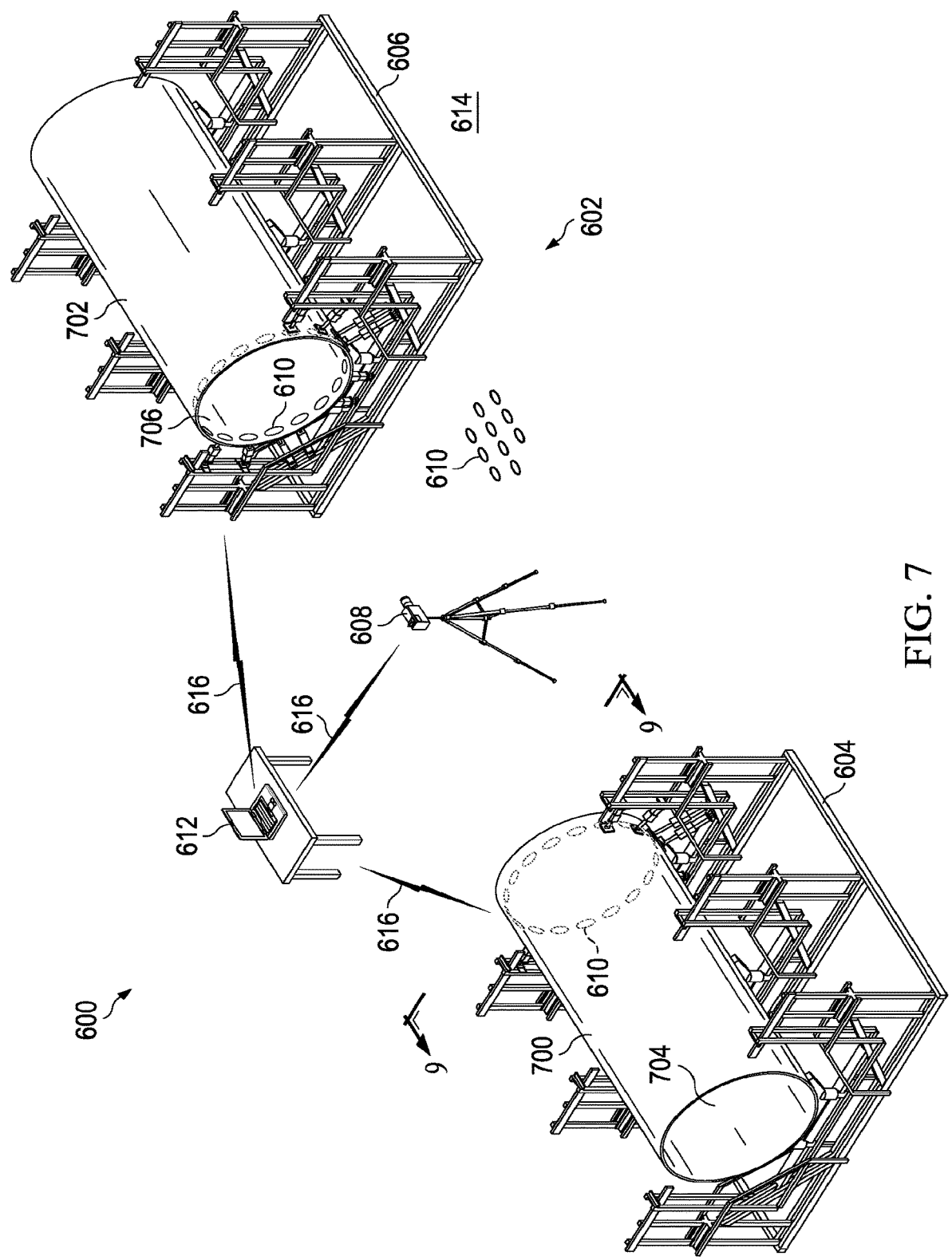
FIG. 7 is an illustration of fuselage sections in a fuselage manufacturing system in accordance with an illustrative embodiment.

Turning next to FIG. 7, an illustration of fuselage sections in a fuselage manufacturing system is depicted in accordance with an illustrative embodiment. In this illustrative example, first fuselage section 700 is shown as being held in first cradle 604. Second fuselage section 702 is depicted as being held in second cradle 606. First fuselage section 700 is an example of a physical implementation for first fuselage section 104 shown in block form in FIG. 1. Second fuselage section 702 is an example of a physical implementation for second fuselage section 106 shown in block form in FIG. 1. In this illustrative example, first cradle 604 and second cradle 606 may actively change the shapes of first fuselage section 700 and second fuselage section 702, respectively.

As depicted, targets 610 may be placed onto at least one of interior surface 704 of first fuselage section 700 or interior surface 706 of second fuselage section 702. Targets 610 are seen in phantom on interior surface 704 of first fuselage section 700 in this view.

Targets 610 are used by laser tracker 608 to generate measurements for the current shape of at least one of first fuselage section 700 or second fuselage section 702. These measurements may be, for example, at least one of the current shape of first fuselage section 700, the current shape of second fuselage section 702, a difference between the current shape and a desired shape of first fuselage section 700, or a difference between the current shape and a desired shape of second fuselage section 702, or some other standard or parameters that define the desired shape for first fuselage section 700.

As depicted, these measurements are used by computer 612 to identify forces needed to change the current shapes of first fuselage section 700, second fuselage section 702, or both towards a desired shape for those fuselage sections. Computer 612 sends commands to at least one of first cradle 604 or second cradle 606 to apply forces to at least one of first fuselage section 700 or second fuselage section 702.

Figure 8:
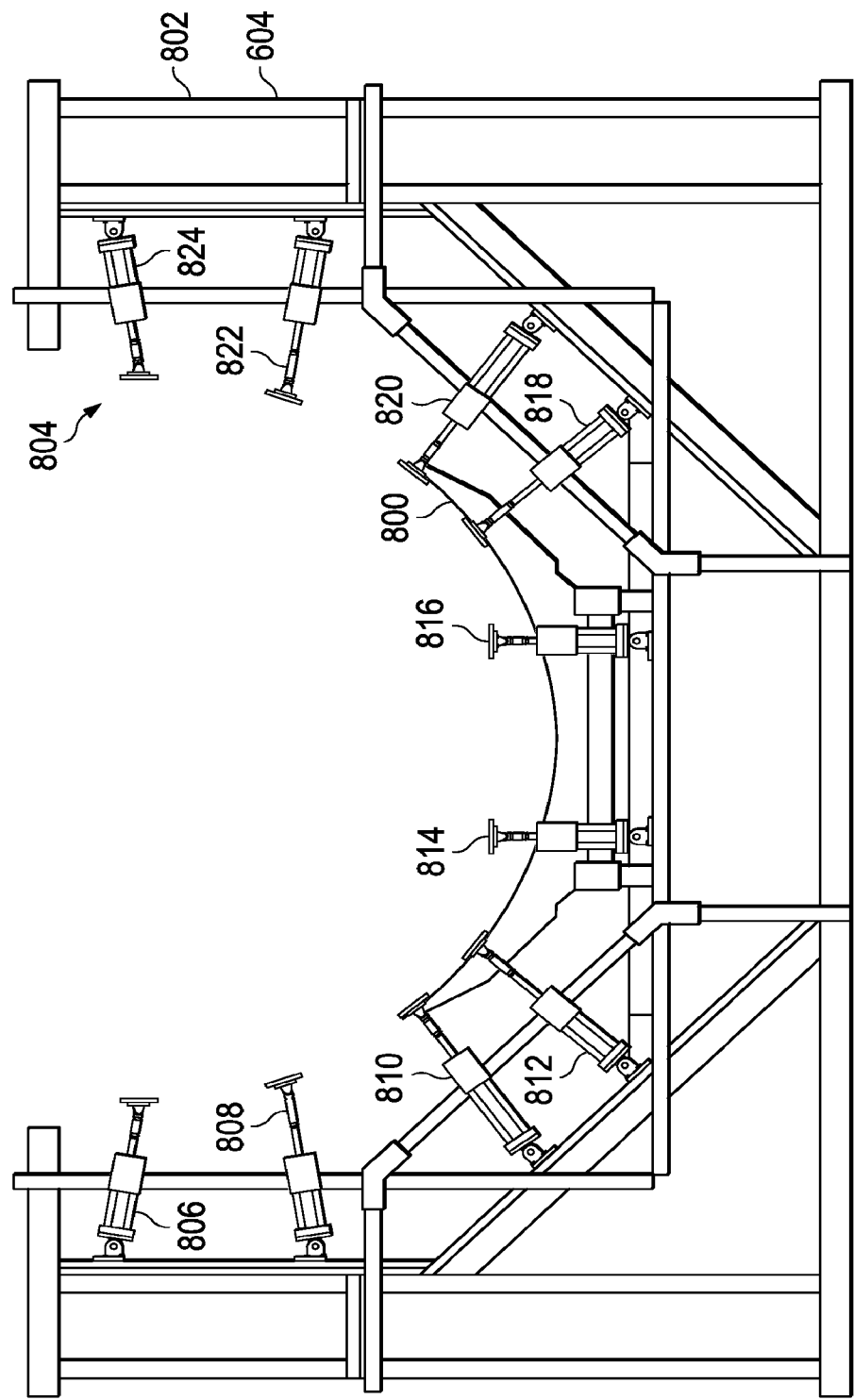
FIG. 8 is an illustration of a cradle in accordance with an illustrative embodiment.

With reference now to FIG. 8, an illustration of a cradle is depicted in accordance with an illustrative embodiment. An end view of first cradle 604 is shown in the direction of arrows 8-8 in FIG. 6.

In this view, first cradle 604 has a number of components. As depicted, these components include holding structure 800, frame 802, and actuators 804.

Holding structure 800 has a design for holding a fuselage section while forces are applied to the fuselage section. Holding structure 800 holds the fuselage section while measurements of the current shape of the fuselage section are made. Holding structure 800 also may be used to position the fuselage section to be joined with another fuselage section. In this illustrative example, the positioning may be performed by moving first cradle 604.

Frame 802 and actuators 804 form an actuator system. As show in this example, actuators 804 includes actuator 806, actuator 808, actuator 810, actuator 812 actuator 814, actuator 816, actuator 818, actuator 820, actuator 822, and actuator 824.

Figure 9:
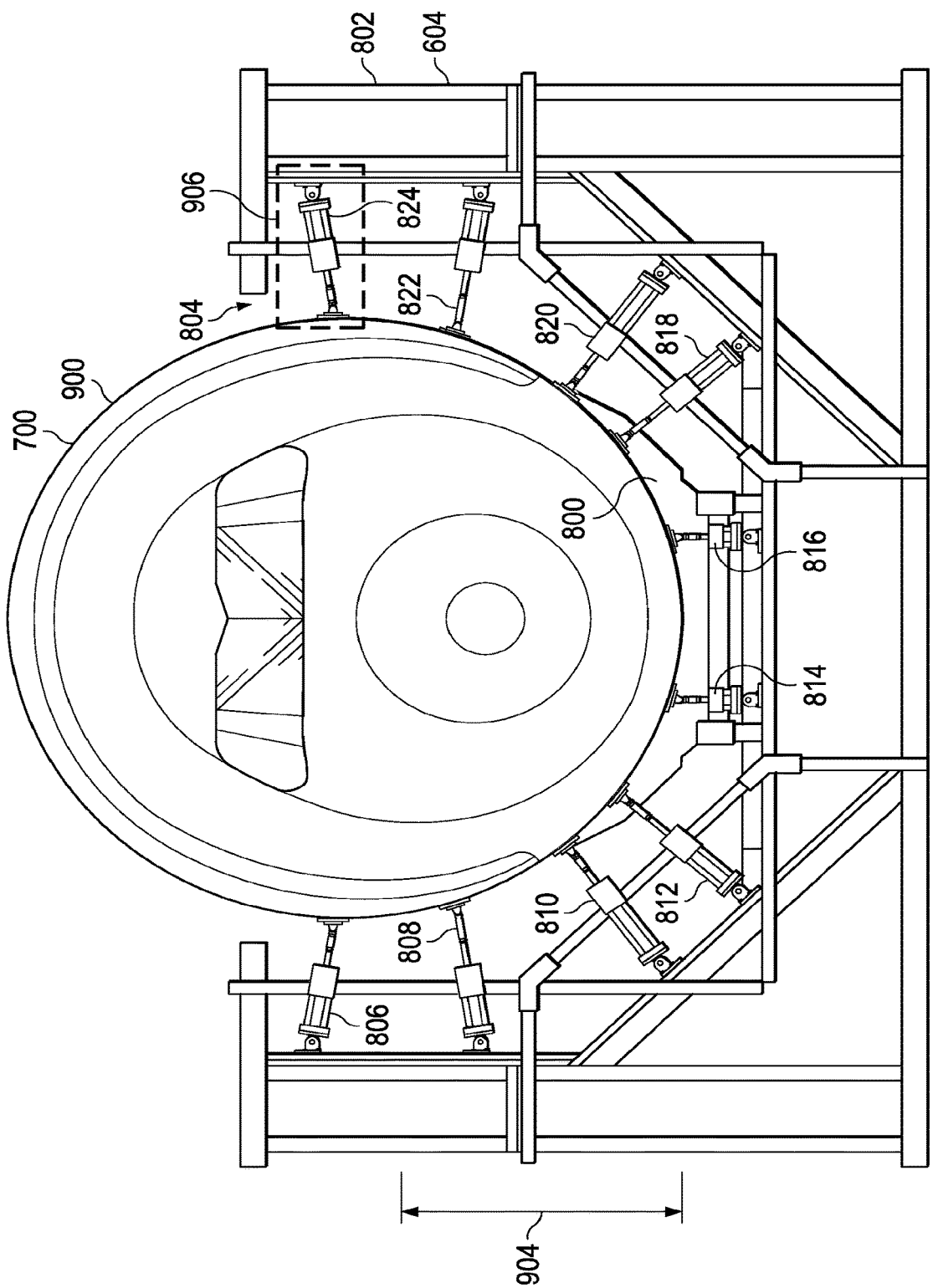
FIG. 9 is an illustration of a view of a first cradle in accordance with an illustrative embodiment.

With reference next to FIG. 9, an illustration of a view of a first cradle is depicted in accordance with an illustrative embodiment. In this illustrative example, first cradle 604 holding first fuselage section 700 is a shown in the direction of arrows 9-9 in FIG. 7. In this example, first fuselage section 700 is held on holding structure 800. While held on holding structure 800, actuators 804 may apply forces to first fuselage section 700 to change the current shape of first fuselage section 700 towards a desired shape for first fuselage section 700.

In this illustrate example, actuators 804 apply forces to a portion of first fuselage section 700. As depicted, actuators 804 apply forces to a portion of first fuselage section 700 that is about one half of circumference 900 of first fuselage section 700. In this particular example, the forces are applied to lower half 904 of first fuselage section 700 resting on holding structure 800. A more detailed illustration of actuator 822 in section 906 is shown in FIG. 10 below.

Figure 10:
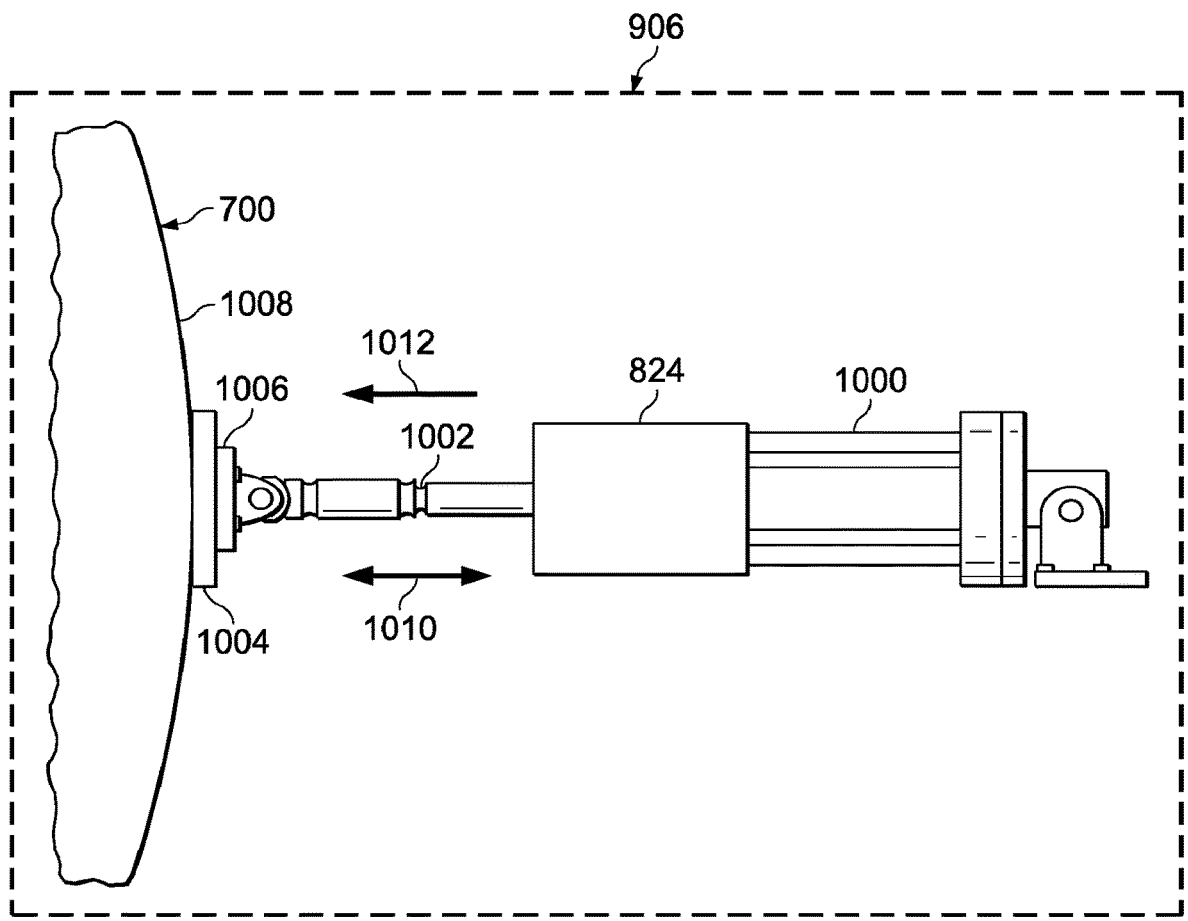
FIG. 10 is an illustration of an actuator in accordance with an illustrative embodiment.

Turning now to FIG. 10, an illustration of an actuator is depicted in accordance with an illustrative embodiment. A more detailed illustration of actuator 824 in section 906 is shown in this figure.

As depicted, actuator 824 is a linear actuator. Actuator 824 is associated with frame 802 (not shown in this view) and positioned to apply a force on first fuselage section 700.

In this illustrative example, actuator 824 includes motor 1000 and linear member 1002. Motor 1000 may take various forms depending on the particular implementation. For example, motor 1000 may be electrical, hydraulic, pneumatic, or some other type of motor. Linear member 1002 has foot 1004 at end 1006 that contacts surface 1008 of first fuselage section 700.

Linear member 1002 in actuator 824 may move in the direction of arrow 1010. Actuator 824 applies force in the direction of arrow 1012 in this example.

Figure 11:
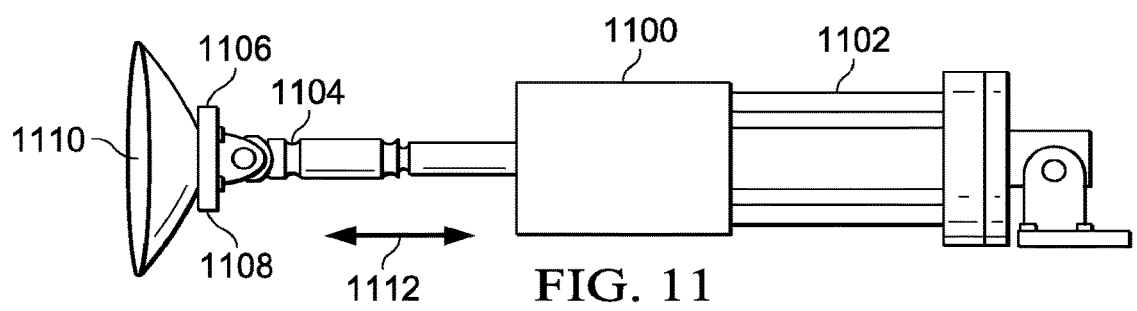
FIG. 11 is another illustration of an actuator in accordance with an illustrative embodiment.

With reference now to FIG. 11, another illustration of an actuator is depicted in accordance with an illustrative embodiment. In this example, actuator 1100 is an example of another actuator that may be used in actuators 804 in FIG. 8. As depicted, actuator 1100 is a linear actuator. Actuator 1100 has motor 1102 and linear member 1104.

Actuator 1100 has foot 1106 at end 1108 of linear member 1104. In this example, foot 1106 has a suction cup 1110. With suction cup 1110, foot 1106 may apply force in the direction of arrow 1112. In other words, actuator 1100 may push or pull on a structure. Arrow 1112 shows that the force may be applied in two directions in contrast to the single direction of actuator 824 in FIG. 10.

Figure 12:
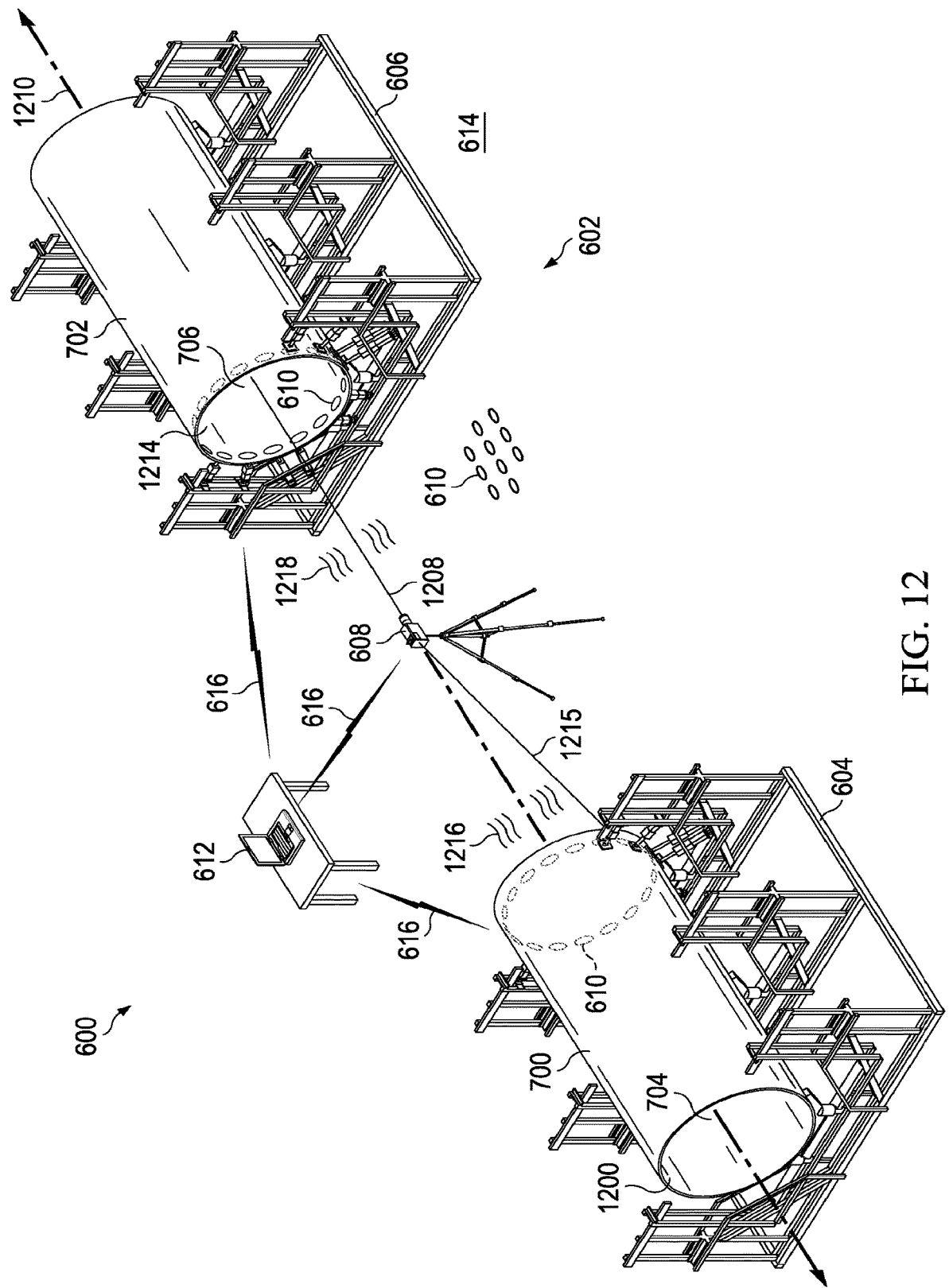
FIG. 12 is an illustration of a metrology system setup in accordance with an illustrative embodiment.

With reference next to FIG. 12, an illustration of a metrology system setup is depicted in accordance with an illustrative embodiment. In this particular example, laser tracker 608 is positioned relative to first fuselage section 700 to make measurements of the shape in interior 1200 of first fuselage section 700.

As shown in this illustrative example, first fuselage section 700 is held in first cradle 604 and second fuselage section 702 is held in second cradle 606. First fuselage section 700 and second fuselage section 702 are positioned such that axis 1210 extends substantially centrally through the interior of first fuselage section 700 and second fuselage section 702.

In this example, a portion of targets 610 are attached to interior surface 704 of first fuselage section 700 as shown in phantom. Another portion of targets 610 are attached to interior surface 706 of second fuselage section 702. Laser tracker 608 sends signals in the form of laser beam 1215 towards the portion of targets 610 attached to interior surface 704 in interior 1200 of first fuselage section 700. Laser tracker 608 also sends laser beam 1208 towards the portion of targets 610 attached to interior surface 706 in interior 1214 of second fuselage section 702. Laser tracker 608 detects response signals to the laser beams in the form of reflected light 1216 and reflected light 1218. In this manner, laser tracker 608 may make measurements of first fuselage section 700 and second fuselage section 702 sequentially, or both first fuselage section 700 and second fuselage section 702 at the same time.

The illustration of fuselage manufacturing system 602 in aircraft manufacturing environment 600 in FIG. 6-12 is not meant to imply limitations to the manner in which other illustrative examples may be implemented. For example, other illustrative examples may use other numbers of actuators. In other illustrative examples, five, fifteen, twenty-four or some other number of actuators may be used. Also the positioning of the actuators may vary in other illustrative examples. For example, the actuators may apply force over a portion that is 50 percent, 80 percent, or another portion of the circumference of a fuselage section.

As another example, axis 1210 may not be used to align first fuselage section 700 and second fuselage section 702. Other positions for these fuselage sections may be used and axis 1210 does not pass through the fuselage sections centrally. The fuselage sections may be in any position where laser tracker 608 is able to make measurements of the fuselage sections.

The different components shown in FIGS. 6-12 may be combined with components in FIGS. 1-5, used with components in FIGS. 1-5, or a combination of the two. Additionally, some of the components in FIGS. 6-12 may be illustrative examples of how components shown in block form in FIGS. 1-12 can be implemented as physical structures.

Figure 13:
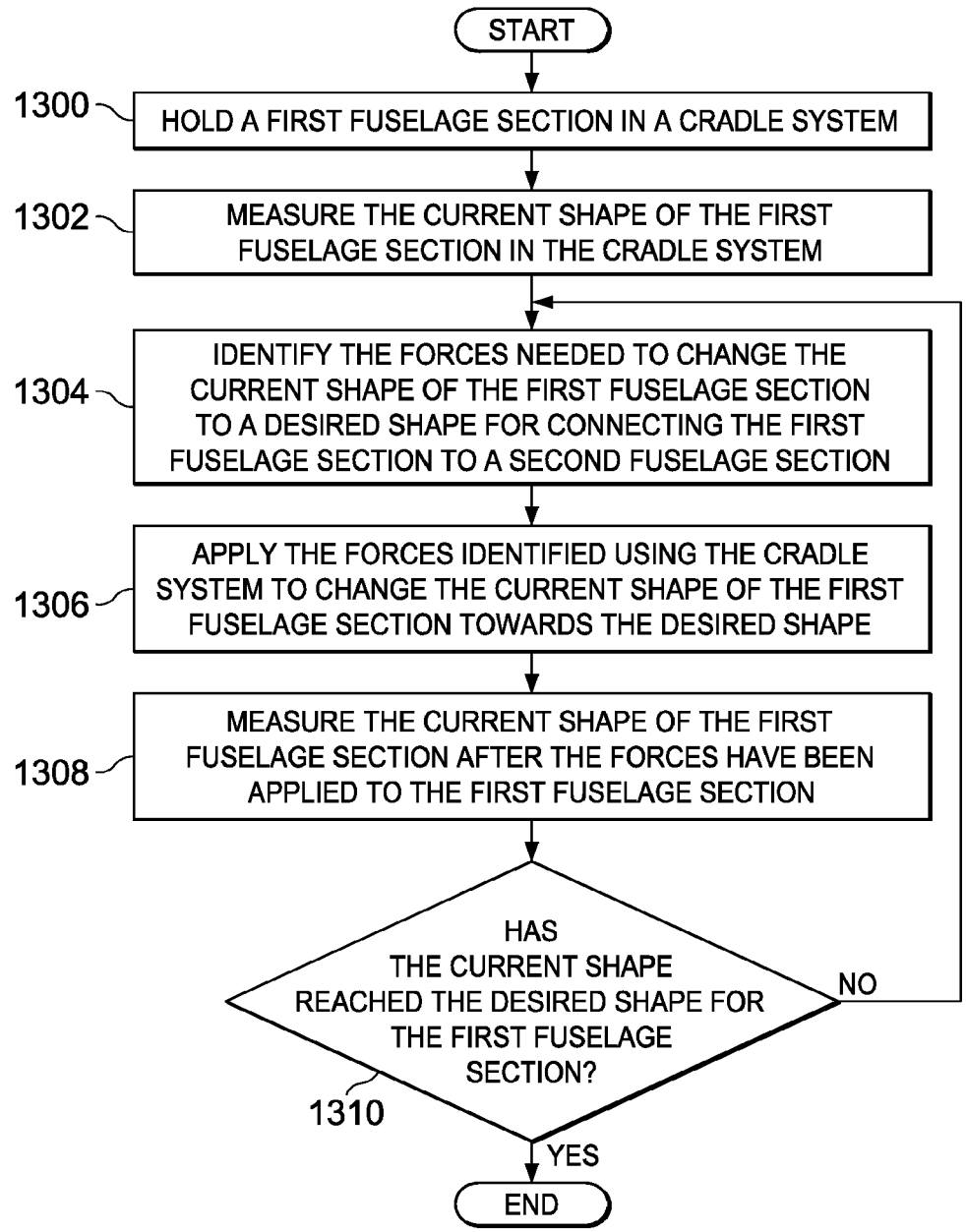
FIG. 13 is an illustration of a flowchart of a process for processing fuselage sections in accordance with an illustrative embodiment.

Turning next to FIG. 13, an illustration of a flowchart of a process for processing fuselage sections is depicted in accordance with an illustrative embodiment. The process in FIG. 13 may be implemented in aircraft manufacturing environment 100 to process fuselage sections 103. In particular, the different operations may be implemented using fuselage manufacturing system 102 in FIG. 1.

The process begins by holding a first fuselage section in a cradle system (operation 1300). The process then measures the current shape of the first fuselage section in the cradle system (operation 1302).

The process identifies the forces needed to change the current shape of the first fuselage section to a desired shape for connecting the first fuselage section to a second fuselage section (operation 1304). In identifying the forces, the process may identify a difference between the current shape of the first fuselage section and the desired shape for the first fuselage section using at least one of a metrology system or a controller. This difference may then be used to identify forces needed to make a change in the shape of the first fuselage section. The process then applies the forces identified using the cradle system to change the current shape of the first fuselage section towards the desired shape (operation 1306).

The process then measures the current shape of the first fuselage section after the forces have been applied to the first fuselage section (operation 1308). A determination is made as to whether the current shape has reached the desired shape for the first fuselage section (operation 1310).

If the current shape has reached the desired shape, the process terminates. Otherwise the process returns to operation 1304. This process may repeat operation 1304, operation 1306, operation 1308, and operation 1310 as many times as needed to reach the desired shape for the first fuselage section. The operations form a feedback loop for actively changing the current shape of the first fuselage section.

Further, different operations in FIG. 13 may be applied to a second fuselage section. These operations may be applied to the first fuselage section and a second fuselage section, sequentially, or about the same time.

For example, the process may hold the second fuselage section in the cradle system and measure a second current shape of the second fuselage section. The process may also identify the forces needed to change at least one of the first current shape of the first fuselage section towards the first desired shape or a second current shape of the second fuselage section to a second desired shape for connecting the first fuselage section to second fuselage section. Further, the process may apply the forces to change at least one of the first current shape of the first fuselage section towards the first desired shape or the second current shape of the second fuselage section towards the second desired shape.

Figure 14:
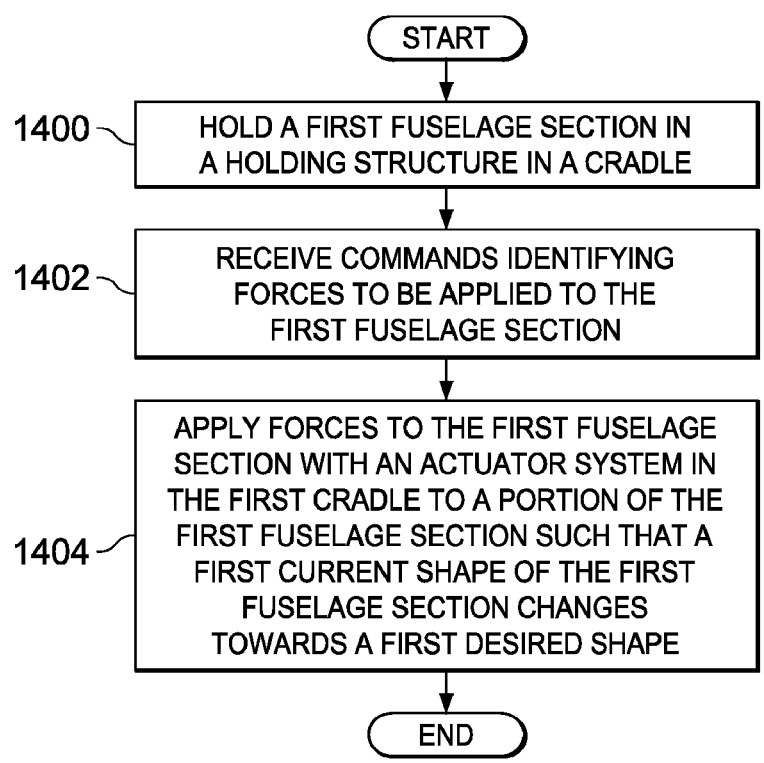
FIG. 14 is an illustration of a flowchart of a process for applying forces to a fuselage section in accordance with an illustrative embodiment.

With reference next to FIG. 14, an illustration of a flowchart of a process for applying forces to a fuselage section is depicted in accordance with an illustrative embodiment. The process illustrated in FIG. 14 may be implemented in an aircraft manufacturing environment 100 in FIG. 1. In particular, the processes may be implemented using cradle 202 in cradle system 108 as shown in FIG. 2.

The process begins by holding a first fuselage section in a holding structure in a cradle system (operation 1400). Next, the process receives commands identifying forces to be applied to the first fuselage section (operation 1402).

The process then applies forces to the first fuselage section with an actuator system in the first cradle to a portion of the first fuselage section such that a first current shape of the first fuselage section changes towards a first desired shape (operation 1404). The first desired shape is a shape for the fuselage section that is desired for joining the first fuselage section to a second fuselage section.

Figure 15:
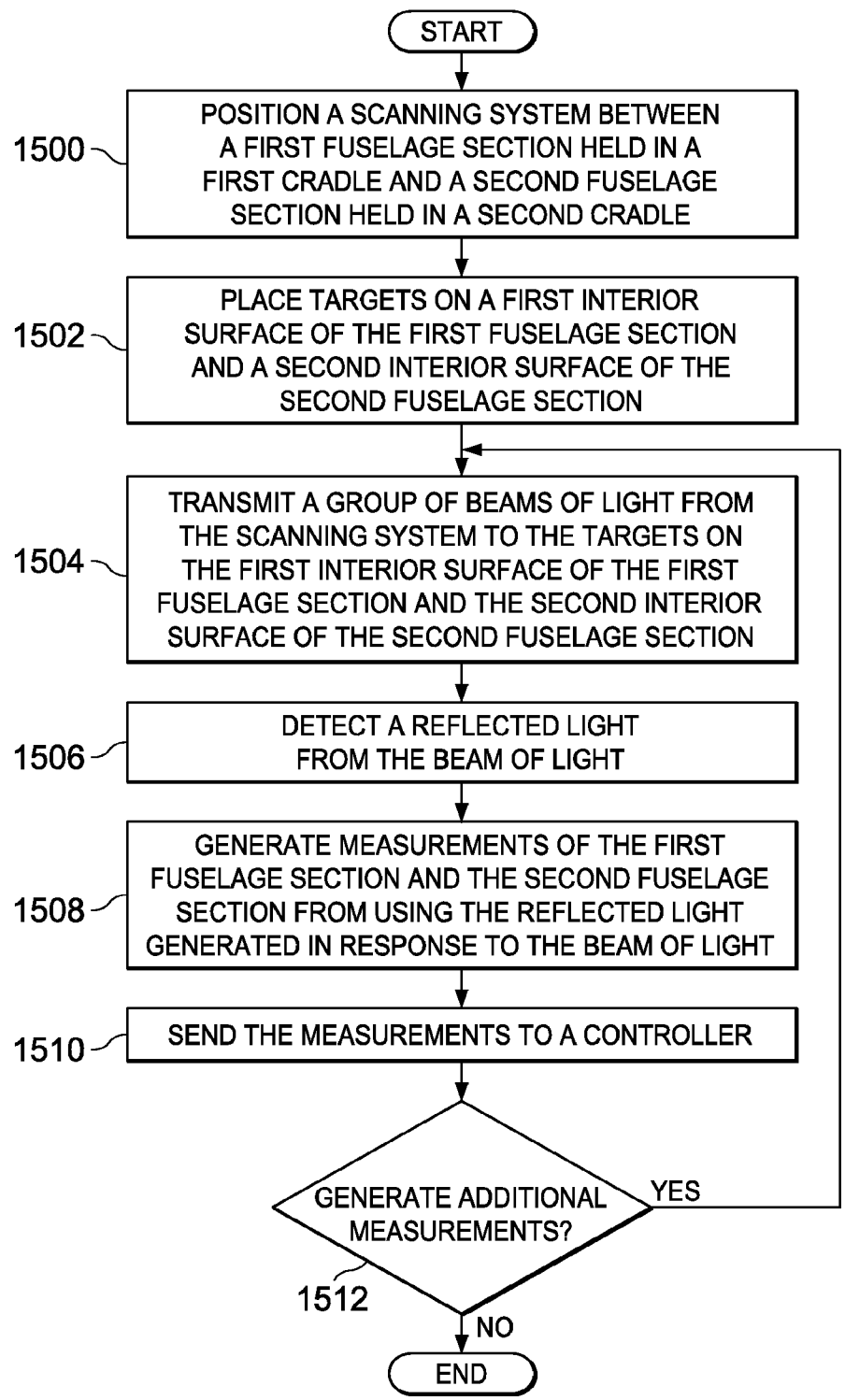
FIG. 15 is an illustration of a flowchart of a process for generating measurements of fuselage sections using a metrology system in accordance with an illustrative embodiment.

Turning to FIG. 15, an illustration of a flowchart of a process for generating measurements of fuselage sections using a metrology system is depicted in accordance with an illustrative embodiment. The process illustrated in FIG. 15 may be implemented using metrology system 110 as depicted in FIG. 3. In this example, scanning system 310 and targets 312 in metrology system 110 are used to generate measurements of two fuselage sections.

The process begins by positioning a scanning system between a first fuselage section held in a first cradle and a second fuselage section held in a second cradle (operation 1500). The positioning of the scanning system may be performed by moving at least one of the scanning system, the first cradle, or the second cradle. The positioning is such that the scanning system is able to transmit signals, such as a group of beams of light to targets on at least one of the first fuselage section or the second fuselage section.

The process then places targets on a first interior surface of the first fuselage section and a second interior surface of the second fuselage section (operation 1502). The process then transmits a group of beams of light from the scanning system to the targets on the first interior surface of the first fuselage section and the second interior surface of the second fuselage section (1504). The process detects a reflected light from the beam of light (operation 1506).

The process then generates measurements of the first fuselage section and the second fuselage section from using the reflected light generated in response to the beam of light (operation 1508). In this illustrative example, the measurements may be the dimensions for the current shape of the first fuselage section and second fuselage section. In other illustrative examples, the measurements may be a difference between a current shape and a desired shape for the fuselage sections. In yet other illustrative examples, both of these types of measurements may be generated.

The process the sends the measurements to a controller (operation 1510). The controller uses these measurements to determine whether the force should be applied and what types of forces should be applied to the fuselage sections.

A determination is made as to whether to generate additional measurements (operation 1512). For example, additional measurements may be made each time a current shape of the first fuselage section is changed. If additional measurements are to be generated, the process returns to operation 1504. Otherwise the process terminates. The measurements enable shaping at least one of the first fuselage or the second fuselage for joining the first fuselage to the second fuselage.

Figure 16:
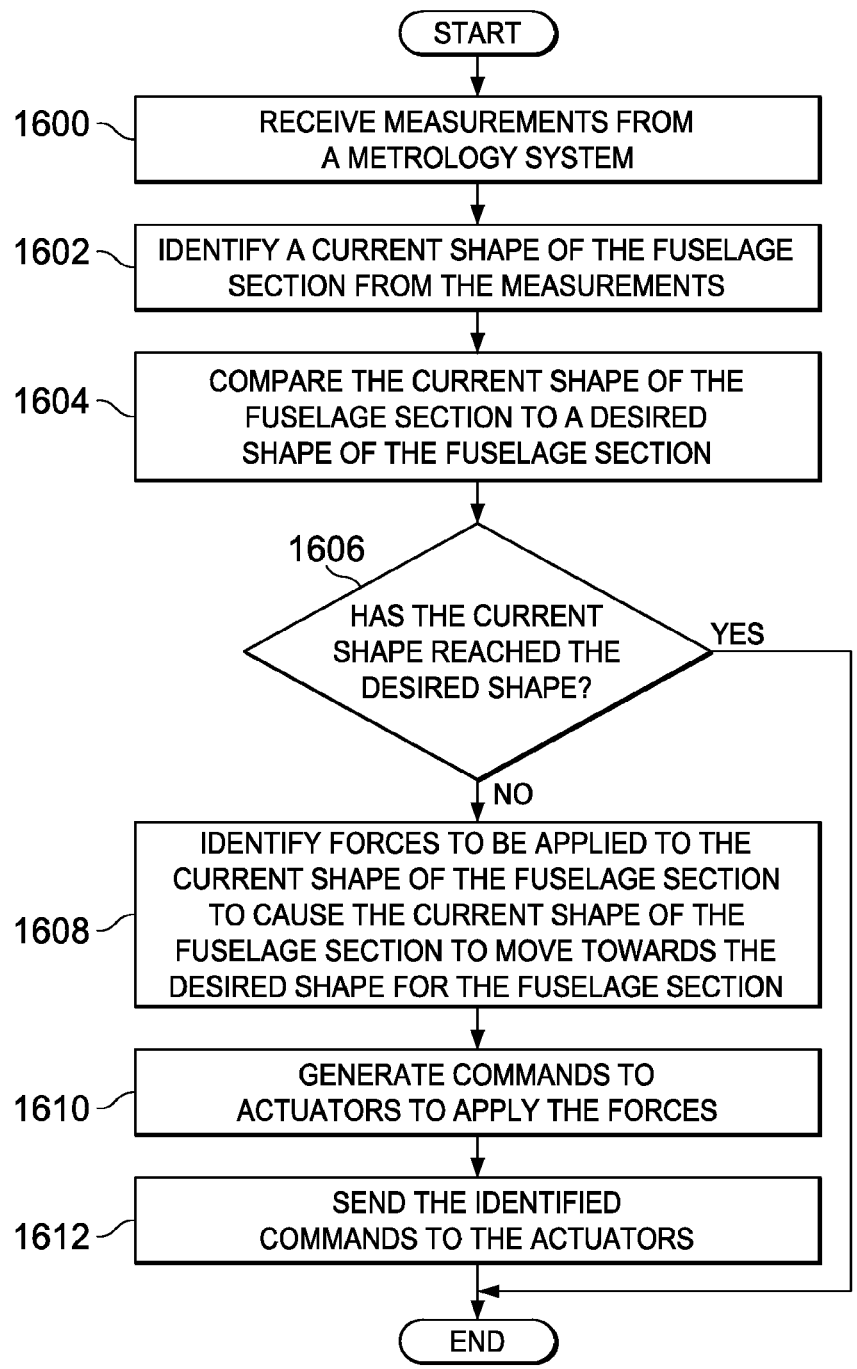
FIG. 16 is an illustration of a flowchart of a process for identifying forces for changing the shape of a fuselage section in accordance with an illustrative embodiment.

With reference next to FIG. 16, an illustration of a flowchart of a process for identifying forces for changing the shape of a fuselage section is depicted in accordance with an illustrative embodiment. The process illustrated in FIG. 16 may be implemented in a controller, such as controller 112 in FIG. 1.

The process begins by receiving measurements from a metrology system (operation 1600). The process then identifies a current shape of the fuselage section from the measurements (operation 1602). The process then compares the current shape of the fuselage section to a desired shape of the fuselage section (operation 1604). This comparison may be made by using a model of the desired shape for the current fuselage section or a model of the current shape of a second fuselage section to which the fuselage section being processed is to be joined.

A determination is made as to whether the current shape has reached the desired shape (operation 1606). If the current shape has reached the desired shape, the process terminates.

Otherwise, the process identifies forces to be applied to the current shape of the fuselage section to cause the current shape of the fuselage section to move towards the desired shape for the fuselage section (operation 1608). In operation 1608, the forces may be identified using various models. For example, a finite element model of the fuselage section may be used to identify changes in the current shape of the fuselage section in response to the application of forces. Forces are selected to identify whether these changes cause the current shape of the fuselage section to move towards the desired shape. These forces may be selected using various techniques. For example, at least one of an artificial intelligence program, a knowledgebase, an expert system, or some other technique may be used to identify the forces.

Once the forces are identified, the process generates commands to actuators to apply the forces (operation 1610). The process then sends the identified commands to the actuators (operation 1612), with the process terminating thereafter. The process in FIG. 16 may be repeated each time measurements are received from a metrology system.

Turning now to FIG. 17, an illustration of a flowchart of a process for joining fuselage sections is depicted in accordance with an illustrative embodiment. The process illustrated in FIG. 17 may be implemented in aircraft manufacturing environment 100 in FIG. 1 to join fuselage sections to each other. This process may be used when the two fuselage sections have a desired shape for joining the two fuselage sections to each other.

The process begins by positioning the first fuselage section relative to the second fuselage section (operation 1700). This positioning is performed with fuselage sections that have been changed in shape using the process illustrated in FIG. 13.

The process then joins the first fuselage section with the first desired shape to the second fuselage section with the second desired shape (operation 1702) with the process terminating thereafter. In operation 1702, the joining of the first fuselage section with the second fuselage section may be made using different types of techniques. For example, the two fuselage sections may be joined using at least one of a butt joint, a splice joint, or some other suitable mechanism.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1502 and operation 1504 may be performed in reverse order. In another example, operation 1502 and operation 1504 may be performed at substantially the same time.

As another illustrative example, measurements may be made in a single fuselage section rather than to fuselage sections in the process illustrated in FIG. 15. In yet other illustrative examples, the process may be applied to measurements being made for three or more fuselage sections. In this type of implementation, additional laser trackers may be placed between fuselage sections.

In still another illustrative example, operation 1502 in FIG. 15 may be omitted in some illustrative examples. The placing of the targets may be omitted, for example, when the targets are features on the fuselage sections.

The illustrative embodiments of the disclosure may be described in the context of aircraft manufacturing and service method 1800 as shown in FIG. 18 and aircraft 1900 as shown in FIG. 19. Turning first to FIG. 18, an illustration of an aircraft manufacturing and service method is depicted in the form of a block diagram in accordance with an illustrative embodiment. During pre-production, aircraft manufacturing and service method 1800 may include specification and design 1802 of aircraft 1900 in FIG. 19 and material procurement 1804.

During production, component and subassembly manufacturing 1806 and system integration 1808 of aircraft 1900 in FIG. 19 takes place. Thereafter, aircraft 1900 in FIG. 19 may go through certification and delivery 1810 in order to be placed in service 1812. While in service 1812 by a customer, aircraft 1900 in FIG. 19 is scheduled for routine maintenance and service 1814, which may include modification, reconfiguration, refurbishment, and other maintenance or service.

Each of the processes of aircraft manufacturing and service method 1800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 19, an illustration of an aircraft is depicted in the form of a block diagram in which an illustrative embodiment may be implemented. In this example, aircraft 1900 is produced by aircraft manufacturing and service method 1800 in FIG. 18 and may include airframe 1902 with plurality of systems 1904 and interior 1906. Examples of systems 1904 include one or more of propulsion system 1908, electrical system 1910, hydraulic system 1912, and environmental system 1914. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1800 in FIG. 18.

In one illustrative example, components or subassemblies produced in component and subassembly manufacturing 1806 in FIG. 18 may be fabricated or manufactured in a manner similar to components or subassemblies produced while aircraft 1900 is in service 1812 in FIG. 18. As yet another example, one or more apparatus embodiments, method embodiments, or a combination thereof may be utilized during production stages, such as component and subassembly manufacturing 1806 and system integration 1808 in FIG. 18. For example, fuselage sections for aircraft 1900 may be joined to each other to form the fuselage for an aircraft 1900 during component and subassembly manufacturing 1806.

One or more apparatus embodiments, method embodiments, or a combination thereof may be utilized while aircraft 1900 is in service 1812, during maintenance and service 1814 in FIG. 18, or both. For example, during refurbishment of 1900 during maintenance and service 1814, one or more sections of the fuselage may be removed and replaced with new sections that are joined using a fuselage manufacturing system. The use of a number of the different illustrative embodiments may substantially expedite the assembly of aircraft 1900, reduce the cost of aircraft 1900, or both expedite the assembly of aircraft 1900 and reduce the cost of aircraft 1900.

Thus, one or more of the illustrative embodiments provide a method and apparatus for processing fuselage sections to form the fuselage for an aircraft. In one illustrative example, an apparatus includes a cradle system, a metrology system, and a controller. The cradle system holding the fuselage section applies forces to the fuselage section to change the current shape of the fuselage section. The metrology system makes measurements of the current shape of the fuselage section. The controller receives measurements from the metrology system and identifies the forces needed to change the current shape of the fuselage section towards a desired shape for the fuselage section. This desired shape is one that may be used to connect the fuselage section to another fuselage section.

With the apparatus in the different processes performed, joining fuselage sections may be performed more easily and with less labor cost as compared to currently used techniques. With an illustrative example, the fuselage section may be changed using a feedback loop to reach a desired shape for the fuselage section. Further, the number of human operators needed to perform the changes of measurements is fewer than those currently available systems for joining fuselage sections. In this manner, an illustrative example may provide for a better fit between fuselage sections, the reduction in cost in joining fuselage sections, reduced amounts of labor needed to join fuselage sections, or some combination thereof.

With respect to the metrology system, in one illustrative embodiment, a method for measuring fuselage sections is provided. A scanning system is positioned between a first fuselage section held in a first cradle and a second fuselage section held in a second cradle. A group of beams of light is transmitted from the scanning system to targets on a first interior surface of the first fuselage section and a second interior surface of the second fuselage section. A reflected light is detected from a beam of light.

Measurements of the first fuselage section and the second fuselage section are generated from using the reflected light generated in response to the beam of light. The measurements enable shaping at least one of the first fuselage section and the second fuselage section for joining the first fuselage section to the second fuselage section.

The process also places the targets on the first interior surface of the first fuselage section and the second interior surface of the second fuselage section. Also, generating the measurements may comprise identifying a current shape of the first fuselage section and the second fuselage section.

In an illustrative example, generating the measurements also may comprise identifying a difference between the current shape of the first fuselage section and a desired shape for the first fuselage section. In another illustrative example, the current shape is a first current shape and a desired shape is based on at least one of the first current shape of the first fuselage section and a second current shape of the second fuselage section or parameters specified by a design for the first fuselage section. In an illustrative example, the current shape and the desired shape are contours for the first fuselage section.

The process for measuring fuselage sections may include repeating transmitting the group of beams of light from the scanning system to the targets on the first interior surface of the first fuselage section and the second interior surface of the second fuselage section; detecting the reflected light from the group of beams of light; and generating the measurements of the first fuselage section and the second fuselage section from using the reflected light generated in response to the group of beams of light, wherein the measurements enable shaping at least one of the first fuselage section and the second fuselage section for joining the first fuselage section to the second fuselage section each time a current shape of the first fuselage section is changed. In one illustrative example, the scanning system is an optical metrology system and includes at least one of a lidar system or a laser scanning system.

The process also may send the measurements from the scanning system to a controller that identifies forces needed to change a current shape of the first fuselage section to a desired shape for connecting the first fuselage section to the second fuselage section and sends commands to a cradle system to apply the forces to change the current shape of the first fuselage section towards the desired shape. In an illustrative example, the measurements are generated without the scanning system contacting the first fuselage section and the second fuselage section. In an illustrative example, the scanning system and the targets form a metrology system.

In another illustrative embodiment, another method for measuring fuselage sections is provided. A scanning system is positioned between a first fuselage section held in a first cradle and a second fuselage section held in a second cradle. Measurements of the first fuselage section and the second fuselage section are generated using the scanning system. The measurements enable shaping at least one of the first fuselage section and the second fuselage section for joining the first fuselage section to the second fuselage section. In an illustrative example, the process also may place targets on a first interior surface of the first fuselage section and a second interior surface of the second fuselage section. In another illustrative example, the process also may send the measurements from the scanning system to a controller that identifies forces needed to change a current shape of the first fuselage section to a desired shape for connecting the first fuselage section to the second fuselage section and sends commands to a cradle system to apply the forces to change the current shape of the first fuselage section towards the desired shape In generating measurements, the process may transmit a beam of light from the scanning system to targets on a first interior surface of the first fuselage section and a second interior surface of the second fuselage section; detect reflected light from the beam of light; and generate the measurements of the first fuselage section and the second fuselage section from using the reflected light generated in response to the beam of light. In an illustrative example, the scanning system is an optical metrology system and includes at least one of a lidar system or a laser scanning system.

In yet another illustrative embodiment, a metrology system for measuring fuselage sections is provided. The metrology system comprises a scanner that transmits a group of beams of light from the scanning system to targets on a first interior surface of a first fuselage section and a second interior surface of a second fuselage section. The scanner further detects a reflected light from the beam of light and generates measurements of the first fuselage section and the second fuselage section from using the reflected light generated in response to the beam of light. The measurements enable shaping at least one of the first fuselage section and the second fuselage section for joining the first fuselage section to the second fuselage section.

In an illustrative example, the scanner sends the measurements to a controller that identifies forces needed to change a current shape of the first fuselage section to a desired shape for connecting the first fuselage section to the second fuselage section and sends commands to a cradle system to apply the forces to change the current shape of the first fuselage section towards the desired shape. In another illustrative example, the group of beams of light is a group of laser beams. In an illustrative example, the metrology system may further include the targets, wherein the targets are selected from at least one of a reflective tape, a tooling ball, or a feature on one of the first fuselage section and the second fuselage section.

In one illustrative embodiment, an apparatus comprises a cradle system, a metrology system, and a controller. The cradle system holds a first fuselage section and applies forces to the first fuselage section to change a current shape of the first fuselage section. The metrology system makes measurements of the current shape of the first fuselage section. The controller receives the measurements from the metrology system, identifies the forces needed to change the current shape of the first fuselage section towards a desired shape for connecting the first fuselage section to a second fuselage section, and sends commands to the cradle system to apply the forces to change the current shape of the first fuselage section towards the desired shape.

In some illustrative examples, new measurements are made by the metrology system after the cradle system applies the forces to the first fuselage section to change the current shape of the first fuselage section towards the desired shape and the controller uses the new measurements as a feedback to identify the forces needed to change the current shape of the first fuselage section towards the desired shape if the desired shape has not been reached, and sends new commands to the cradle system to apply the forces to change the current shape of the first fuselage section towards the desired shape. In some illustrative examples, the cradle system applies the forces using actuators. In some illustrative examples, at least one of the metrology system or the controller identifies a difference between the current shape of the first fuselage section and the desired shape for the first fuselage section. In some illustrative examples, the current shape is a first current shape and the desired shape for the first fuselage section is based on at least one of the first current shape of the first fuselage section and a second current shape of the second fuselage section or parameters specified by a design for the first fuselage section. In some illustrative examples, a first current shape and the desired shape are contours for the first fuselage section.

In some illustrative examples, the current shape is a first current shape and the desired shape is a first desired shape. Further, the cradle system holds the first fuselage section in a first cradle and the second fuselage section in a second cradle. The metrology system makes the measurements of the first current shape and a second current shape of the second fuselage section. The controller receives the measurements from the metrology system, identifies the forces needed to change at least one of the first current shape of the first fuselage section towards the first desired shape or the second current shape of the second fuselage section to a second desired shape for connecting the first fuselage section to the second fuselage section, and sends the commands to the cradle system to apply the forces to change the at least one of the first current shape of the first fuselage section towards the first desired shape or the second current shape of the second fuselage section towards the second desired shape. In some illustrative examples, the first cradle holds the first fuselage section and the second cradle holds the second fuselage section relative to each other for joining the first fuselage section with the first desired shape to the second fuselage section with the second desired shape.

In some illustrative examples, the cradle system applies the forces on a portion of at least one of the first fuselage section or the second fuselage section. In some examples, the portion is about one half of a circumference of the first fuselage section.

In another illustrative embodiment, a method for processing fuselage sections is provided. A first fuselage section is held in a cradle system. A current shape of the first fuselage section in the cradle system is measured. Forces needed to change the current shape of the first fuselage section to a desired shape for connecting the first fuselage section to a second fuselage section are identified. The forces identified using the cradle system to change the current shape of the first fuselage section towards the desired shape are applied.

In some illustrative examples the method further comprises repeating the measuring step, the identifying step, and the applying step until the current shape reaches the desired shape. In some illustrative examples, the method further comprises identifying a difference between the current shape of the first fuselage section and the desired shape for the first fuselage section using at least one of a metrology system or a controller. In some illustrative examples, the current shape is a first current shape and the desired shape is based on at least one of the first current shape of the first fuselage section and a second current shape of the second fuselage section or parameters specified by a design for the first fuselage section. In some examples, the current shape and the desired shape are contours for the first fuselage section.

In some illustrative examples, the current shape is a first current shape and the desired shape is a first desired shape. In these illustrative examples, the method may further comprise holding the second fuselage section in the cradle system and measuring a second current shape of the second fuselage section. In these illustrative examples, identifying the forces needed to change the current shape of the first fuselage section towards the first desired shape for connecting the first fuselage section to the second fuselage section comprises identifying the forces needed to change at least one of the first current shape of the first fuselage section towards the first desired shape or the second current shape of the second fuselage section to a second desired shape for connecting the first fuselage section to the second fuselage section. Further, in these illustrative examples, applying the forces identified using the cradle system to change the current shape of the first fuselage section towards the desired shape comprises applying the forces to change the at least one of the first current shape of the first fuselage section towards the first desired shape or the second current shape of the second fuselage section towards the second desired shape.

In some illustrative examples, the method further comprises positioning the first fuselage section relative to the second fuselage section, and joining the first fuselage section with a first desired shape to the second fuselage section with a second desired shape. In some examples, the joining step forms at least one of a butt joint or a splice joint. In some illustrative examples, the measuring step is performed using an optical metrology system and includes at least one of a lidar system or a laser scanning system.

In yet another illustrative embodiment, an apparatus comprises a cradle system, an optical metrology system, and a controller. The cradle system holds a structure and applies forces to the structure to change a current shape of the structure. The optical metrology system makes measurements of the current shape of the structure. The controller receives the measurements from the metrology, identifies the forces needed to change the current shape of the structure to a desired shape for connecting the structure to another structure with a desired fit, and sends commands to the cradle system to apply the forces to change the current shape of the structure towards the desired shape.

The apparatus comprises a cradle system, a metrology system, and a controller. The cradle system holds a first fuselage section and applies forces to the first fuselage section to change a current shape of the first fuselage section. The metrology system makes measurements of the current shape of the first fuselage section. The controller receives the measurements from the metrology system, identifies the forces needed to change the current shape of the first fuselage section towards a desired shape for connecting the first fuselage section to a second fuselage section, and sends commands to the cradle system to apply the forces to change the current shape of the first fuselage section towards the desired shape.

The present illustrative embodiments recognize and take into account one or more considerations. For example, the illustrative embodiments recognize and take into account that it may be undesirable to have large hardware within a manufacturing environment. Large hardware may take up valuable manufacturing space. For example, large hardware may have a large footprint in the manufacturing environment. Further, large hardware may place an undesirable weight on a manufacturing floor. Accordingly, it may be desirable to reduce at least one of the size or the weight of fuselage manufacturing system 102. For example, it may be desirable to apply forces 114 of FIG. 1 or forces 210 of FIG. 2 with a smaller structure than a cradle system with actuators 804.

Figure 20:
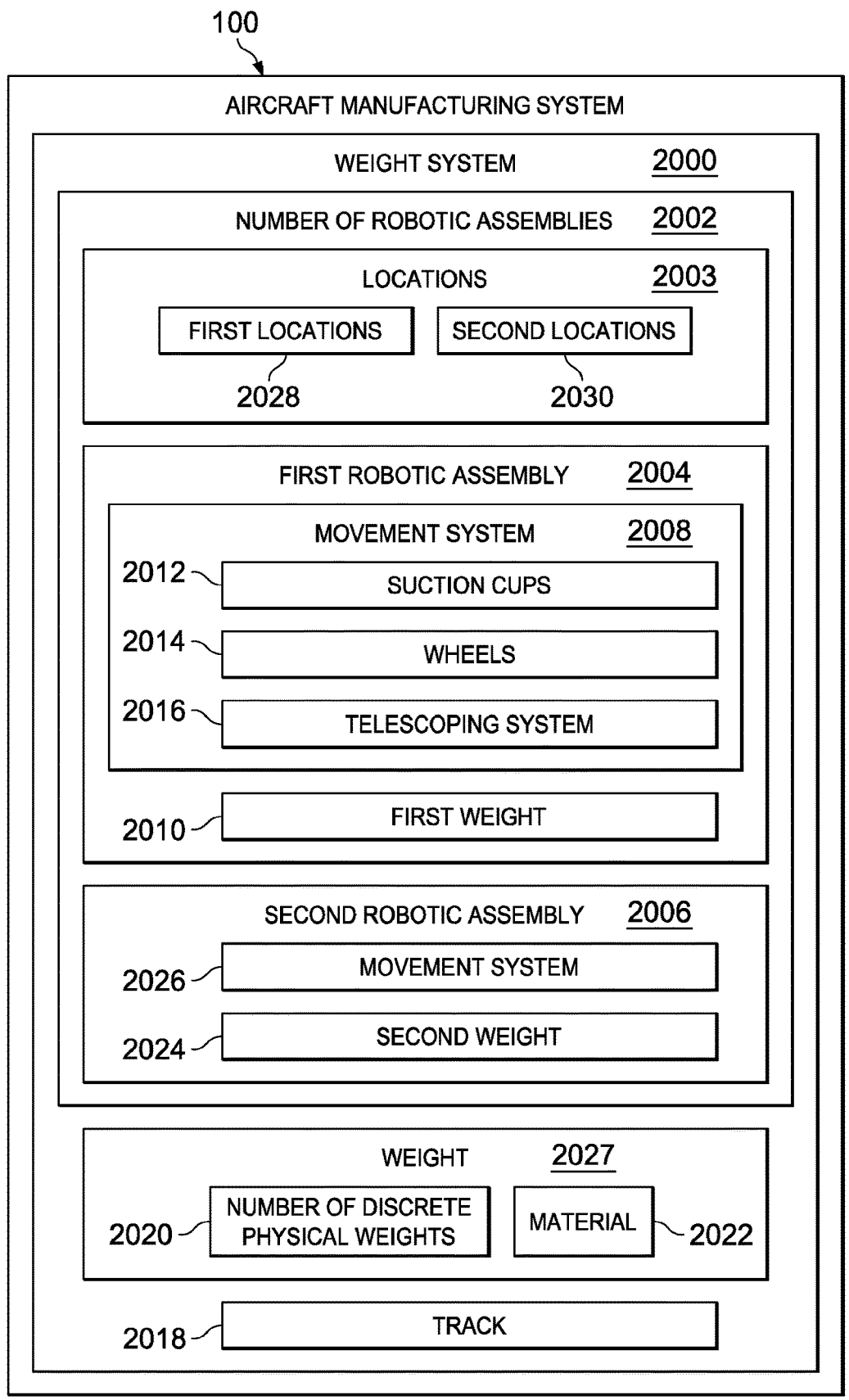
FIG. 20 is an illustration of a weight system in the form of a block diagram in accordance with an illustrative embodiment.

Turning now to FIG. 20, an illustration of a weight system in the form of a block diagram is depicted in accordance with an illustrative embodiment. Weight system 2000 may be used in FIGS. 1-2 and 5 to apply forces 114 to fuselage sections 103. In these illustrative examples, weight system 2000 may apply forces 114 or forces 210 to fuselage sections 103 rather than cradle system 108.

In these illustrative examples, holding structure 201 of cradle system 108 may be present to hold fuselage sections 103. However, actuator system 203 of cradle system 108 may not be present. Other sections of cradle system 108 may also be omitted. By omitting sections of cradle system 108, at least one of the size or weight of cradle system 108 may be reduced.

In these illustrative examples, weight system 2000 applies forces 210 to fuselage section 204 while fuselage section 204 is held in holding structure 201. Forces 210 change current shape 212 of fuselage section 204 towards desired shape 214 when commands 134 are received from controller 112 in FIG. 1.

In the illustrative examples, weight system 2000 may apply forces 210 to portion 215 of fuselage section 204 to change current shape 212 of fuselage section 204. Portion 215 may be some or all of fuselage section 204 depending on the particular implementation. For example, portion 215 may be about one half of a circumference of the fuselage section. As another example, weight system 2000 applies forces 210 to portion 215 of fuselage section 204 located at end 216 of fuselage section 204.

Weight system 2000 includes number of robotic assemblies 2002. Number of robotic assemblies 2002 may move over a fuselage section such as first fuselage section 104 of FIG. 1 to change the shape of the fuselage section. Number of robotic assemblies 2002 may change the shape of the fuselage section as a result of the weight of each of number of robotic assemblies 2002. Number of robotic assemblies 2002 may apply forces 114 to first fuselage section 104 as a result of locations 2003 of number of robotic assemblies 2002 on the fuselage. As depicted, number of robotic assemblies 2002 includes first robotic assembly 2004 and second robotic assembly 2006. However, in some illustrative examples, number of robotic assemblies 2002 may include one robotic assembly or more than two robotic assemblies. First robotic assembly 2004 includes movement system 2008 and first weight 2010.

Movement system 2008 may move first robotic assembly 2004 across a fuselage section such as fuselage section 104 of FIG. 1. Movement system 2008 may include at least one of suction cups 2012, wheels 2014, telescoping system 2016, or any other desirable type of movement system. Movement system 2008 may allow first robotic assembly 2004 to move in any desirable number of directions. For example, when movement system 2008 is telescoping system 2016, movement system 2008 may move first robotic assembly 2004 away from or towards the fuselage. In some illustrative examples, when movement system 2008 includes wheels 2014, movement system 2008 may move first robotic assembly 2004 along track 2018. Track 2018 may restrain the directions that wheels 2014 may move. In other illustrative examples, when movement system 2008 includes wheels 2014, wheels 2014 may move independent of track 2018. When movement system 2008 includes suction cups 2012, movement system 2008 may move first robotic assembly 2004 in any direction on the surface of the fuselage.

By moving first robotic assembly 2004 across the surface of the fuselage, first weight 2010 is moved across the surface of the fuselage. First weight 2010 may include the weight of the functional components of first robotic assembly 2004 and any additional weight components. For example, number of discrete physical weights 2020 may be added onto first robotic assembly 2004 to change first weight 2010. Number of discrete physical weights 2020 may take the form of stackable weights of any desirable shape such as circular weights, square weights, or any other desirable shape of weights. As another example, material 2022 may be added to or removed from a storage container on first robotic assembly 2004 to change first weight 2010. Material 2022 may take the form of sand, water, or any other type of desirable material. By adding or removing number of discrete physical weights 2020 or material 2022 to first robotic assembly 2004, first weight 2010 may be increased or decreased. By changing first weight 2010, first weight 2010 may be tailored to generate a desired force on the fuselage.

It may be desirable to use as few robotic assemblies as possible to apply forces 114 of FIG. 1. In some illustrative examples, a desired force may be generated by placing first robotic assembly 2004 in a desired location. In these illustrative examples, second robotic assembly 2006 may not be present on the fuselage. In other illustrative examples, first robotic assembly 2004 and second robotic assembly 2006 may both be used to apply forces 114 of FIG. 1 to first fuselage section 104.

Second robotic assembly 2006 may have movement system 2024 and second weight 2026. Movement system 2024 may move second robotic assembly 2006 across the surface of the fuselage. By moving second robotic assembly 2006 across the surface of the fuselage, second weight 2026 is moved across the surface of the fuselage. Second weight 2026 may include the weight of the functional components of second robotic assembly 2006 and any additional weight components.

In some illustrative examples, first weight 2010 and second weight 2026 may be the same. In other illustrative examples, first weight 2010 and second weight 2026 may be different from each other. In some illustrative examples, first weight 2010 and second weight 2026 may be configured based on the desired value of forces 114 of FIG. 1. In some illustrative examples, locations 2003 may be determined based on the values of first weight 2010 and second weight 2026.

Referring to FIGS. 1 and 20, controller 112 may control operation of weight system 2000 and metrology system 110. Controller 112 receives measurements 128 from metrology system 110. Controller 112 identifies forces 114 to change first current shape 116 of first fuselage section 104 to first desired shape 120 for connecting first fuselage section 104 to second fuselage section 106. Controller 112 may identify forces 114 based on at least one of any desired locations for applying force, the quantity of robotic assemblies in number of robotic assemblies 2002 in weight system 2000, or the values of the weights associated with each of number of robotic assemblies 2002. Controller 112 then sends commands 134 to weight system 2000 to apply forces 114 to change first current shape 116 of first fuselage section 104 towards first desired shape 120.

Commands 134 may include commands to weight system 2000 to move number of robotic assemblies 2002 across first fuselage section 104 to locations 2003. Commands 134 may include commands to weight system 2000 to increase or decrease at least one of first weight 2010 or second weight 2026. Commands 134 may include commands to add weight 2027 to a robotic assembly. For example, commands 134 may include commands to add weight 2027 to at least one of first robotic assembly 2004 or second robotic assembly 2006. Weight 2027 may be at least one of number of discrete physical weights 2020 or material 2022.

When forces 114 are applied to first fuselage section 104, the change in first current shape 116 may not result in first desired shape 120. Instead, first current shape 116 may be closer to first desired shape 120 but not quite reaching first desired shape 120.

In this case, measurements 128 may be made again by metrology system 110. In this illustrative example, measurements 128 are new measurements 140 made by metrology system 110 after weight system 2000 applies forces 114 to first fuselage section 104 to change first current shape 116 of first fuselage section 104 towards first desired shape 120.

Controller 112 uses new measurements 140 as a feedback to identify forces 114 to change first current shape 116 of first fuselage section 104 further towards first desired shape 120 if first desired shape 120 has not been reached. Controller 112 sends commands 134 in the form of new commands 142 to weight system 2000 to apply forces 114 to change first current shape 116 of first fuselage section 104 towards first desired shape 126. New commands 142 may command weight system 2000 to increase or decrease first weight 2010 or second weight 2026. New commands 142 may change locations 2003 for number of robotic assemblies 2002 of weight system 2000. For example, commands 134 may include commands to weight system 2000 to move number of robotic assemblies 2002 across first fuselage section 104 to first locations 2028 of locations 2003. New commands 142 may move number of robotic assemblies 2002 across first fuselage section 104 to second locations 2030 of locations 2003.

Figure 21:
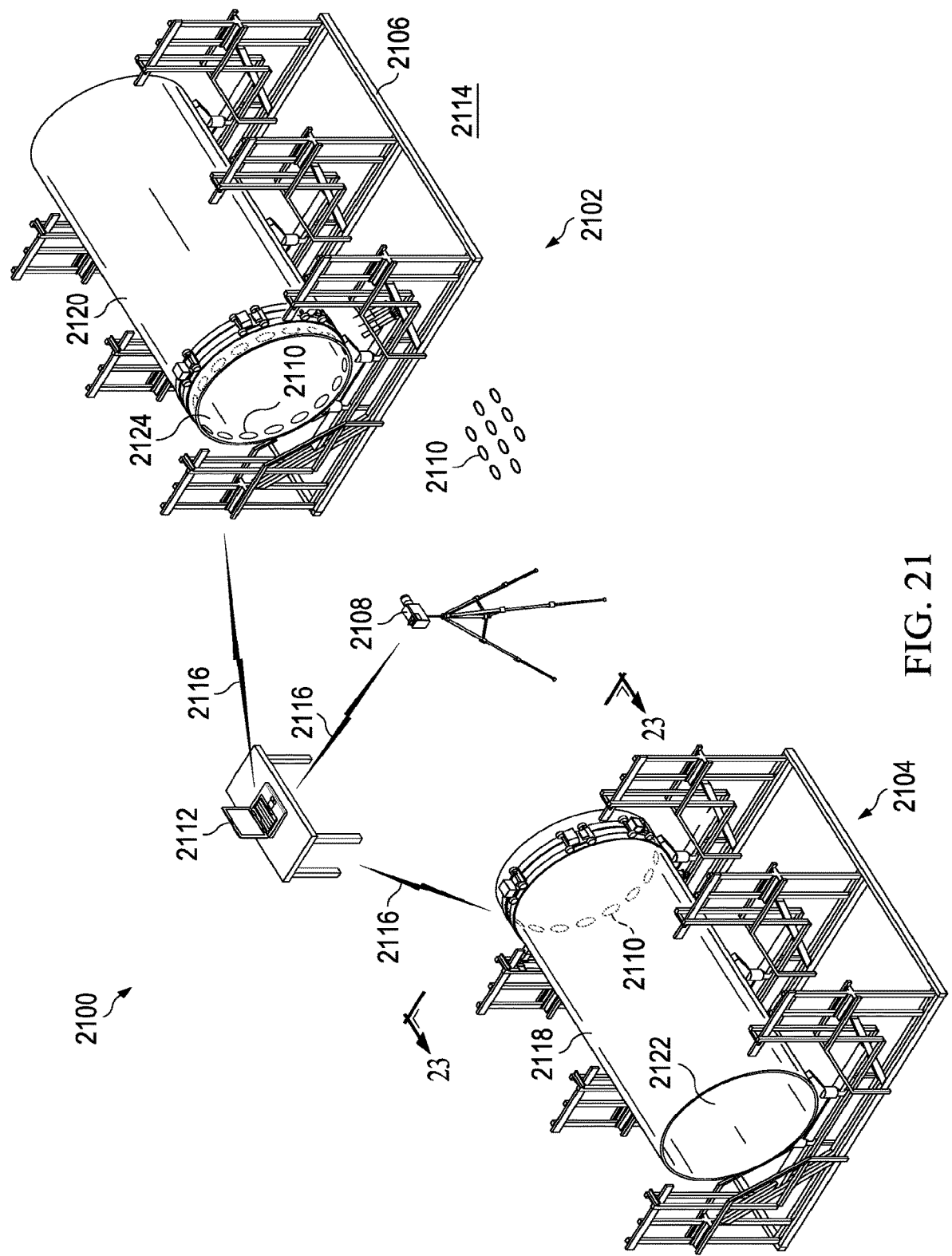
FIG. 21 is an illustration of fuselage sections in a fuselage manufacturing system in accordance with an illustrative embodiment.

Turning now to FIG. 21, an illustration of fuselage sections in a fuselage manufacturing system is depicted in accordance with an illustrative embodiment. Aircraft manufacturing environment 2100 is an example of one physical implementation of aircraft manufacturing environment 100 shown in block form in FIGS. 1 and 20.

In this illustrative example, fuselage manufacturing system 2102 in aircraft manufacturing environment 2100 includes a number of different components. As depicted, the components in aircraft manufacturing environment 2100 include first cradle 2104, second cradle 2106, laser tracker 2108, targets 2110, computer 2112, and weight system 2113. These components are examples of physical components for components shown in block form in aircraft manufacturing environment 100 in FIGS. 1-5 and FIG. 20. First cradle 2104 may be a physical implementation of cradle 202 of FIG. 2. Second cradle 2106 may be also a physical implementation of cradle 202 of FIG. 2. Laser tracker 2108 may be a physical implementation of scanning system 310 of FIG. 3. Targets 2110 may be a physical implementation of targets 312 of FIG. 3. Computer 2112 may be a physical implementation of computer 132 of FIG. 1. Weight system 2113 may be a physical implementation of weight system 2000 of FIG. 20.

First cradle 2104 and second cradle 2106 form a cradle system in this illustrative example. First cradle 2104 and second cradle 2106 are examples of physical implementations for cradles 200 in cradle system 108 shown in block form in FIG. 2. First cradle 2104 and second cradle 2106 may have a holding structure, such as holding structure 201 of FIG. 2. However, first cradle 2104 and second cradle 2106 do not have an actuator system such as actuator system 203 of FIG. 2. First cradle 2104 and second cradle 2106 are substantially similar to first cradle 604 and second cradle 606 except first cradle 2104 and second cradle 2106 do not have actuators such as actuators 804 of FIG. 8.

Laser tracker 2108 and targets 2110 are part of a metrology system. Laser tracker 2108 and targets 2110 may be substantially similar to laser tracker 608 and targets 610 of FIG. 6. Laser tracker 2108 is an example of a physical implementation for scanning system 310 in metrology system 110 as shown in FIG. 3.

In this illustrative example, targets 2110 are located on floor 2114 of aircraft manufacturing environment 2100. Targets 2110 may be placed on fuselage sections or other structures (not shown) and used by laser tracker 2108 generating measurements. As depicted, targets 2110 are examples of physical implementations for targets 312 shown in block form in FIG. 3.

Computer 2112 is a controller for fuselage manufacturing system 2102. Computer 2112 is an example of a physical implementation for controller 112 in FIG. 1. In particular, computer 2112 may be used to implement a computer in computer system 132 shown in block form in FIG. 1. Computer 2112 is substantially similar to computer 612 of FIG. 6.

As depicted, computer 2112 is in communication with weight system 2113 and laser tracker 2108. In this particular example, the communication between these components occurs through a communications medium that includes the use of wireless signals 2116. Weight system 2113 may be a physical implementation of weight system 2000 of FIG. 20.

In this illustrative example, first fuselage section 2118 is shown as being held in first cradle 2104. Second fuselage section 2120 is depicted as being held in second cradle 2106. First fuselage section 2118 is an example of a physical implementation for first fuselage section 104 shown in block form in FIG. 1. First fuselage section 2118 may be substantially the same as first fuselage section 700 of FIG. 7. Second fuselage section 2120 is an example of a physical implementation for second fuselage section 106 shown in block form in FIG. 1. Second fuselage section 2120 may be substantially the same as second fuselage section 702 of FIG. 7. In this illustrative example, weight system 2113 may actively change the shapes of first fuselage section 2118 and second fuselage section 2120, respectively.

As depicted, targets 2110 may be placed onto at least one of interior surface 2122 of first fuselage section 2118 or interior surface 2124 of second fuselage section 2120. Targets 2110 are seen in phantom on interior surface 2122 of first fuselage section 2118 in this view.

Targets 2110 are used by laser tracker 2108 to generate measurements for the current shape of at least one of first fuselage section 2118 or second fuselage section 2120. These measurements may be, for example, at least one of the current shape of first fuselage section 2118, the current shape of second fuselage section 2120, a difference between the current shape and a desired shape of first fuselage section 2118, a difference between the current shape and a desired shape of second fuselage section 2120, or some other standard or parameters that define the desired shape for first fuselage section 2118.

As depicted, these measurements are used by computer 2112 to identify forces to change the current shapes of first fuselage section 2118, second fuselage section 2120, or both towards a desired shape for those fuselage sections. Computer 2112 sends commands to weight system 2113 to apply forces to at least one of first fuselage section 2118 or second fuselage section 2120.

Figure 22:
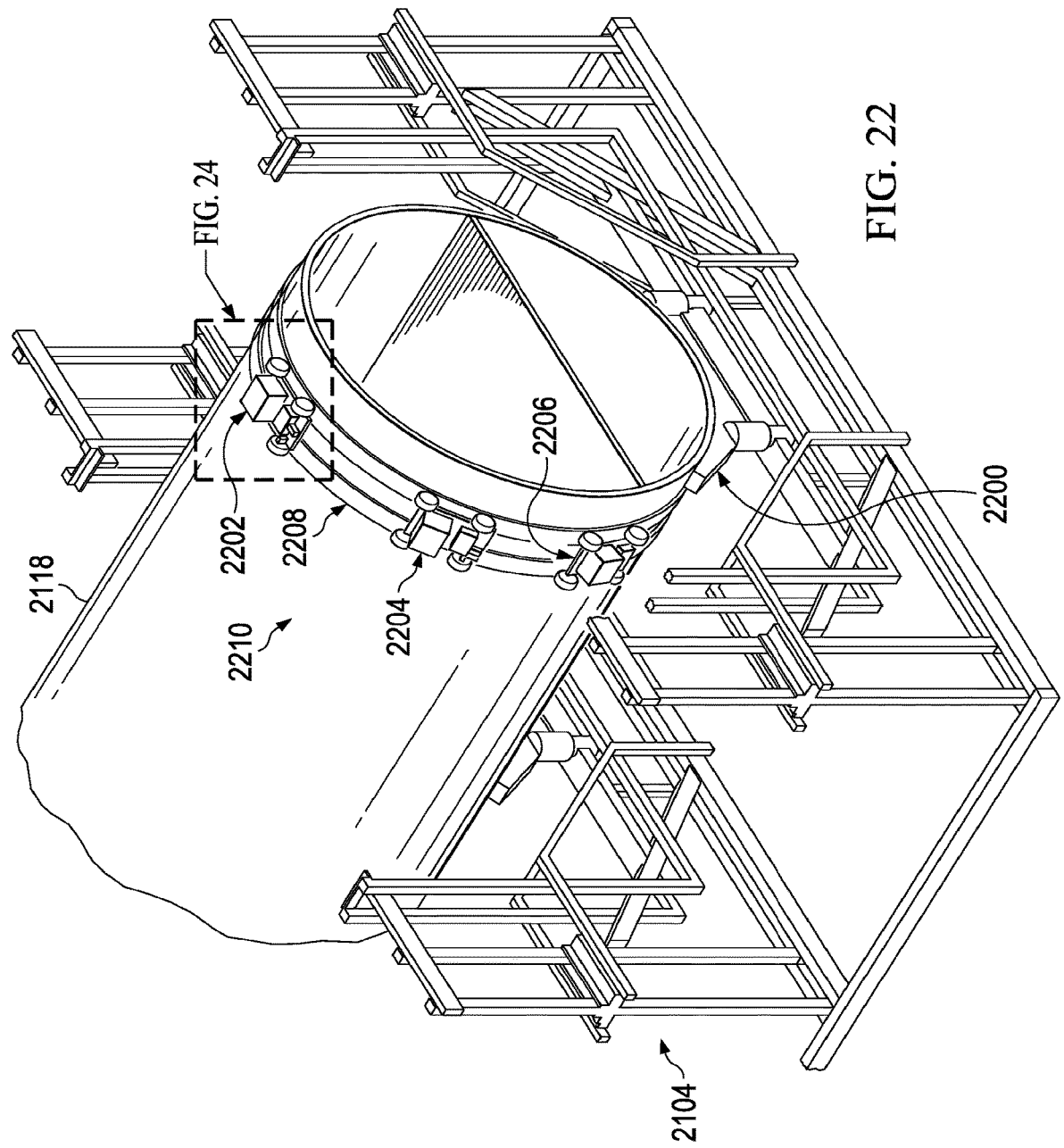
FIG. 22 is an illustration of an isometric view of a weight system and a fuselage section in a fuselage manufacturing system in accordance with an illustrative embodiment.

Turning now to FIG. 22, an illustration of an isometric view of a weight system and a fuselage section in a fuselage manufacturing system is depicted in accordance with an illustrative embodiment. FIG. 22 may be an isometric view of first fuselage section 2118 as shown in the direction of arrows 22-22 in FIG. 21.

In this view, first cradle 2104 includes holding structure 2200. Holding structure 2200 has a design for holding a fuselage section while forces are applied to the fuselage section. Holding structure 2200 may directly contact first fuselage section 2118. Holding structure 2200 holds first fuselage section 2118 while measurements of the current shape of first fuselage section 2118 are made. Holding structure 2200 also may be used to position first fuselage section 2118 to be joined with second fuselage section 2120. In this illustrative example, the positioning may be performed by moving at least one of first cradle 2104 or holding structure 2200. Moving first cradle 2104 within aircraft manufacturing environment 2100 may move first fuselage section 2118 in aircraft manufacturing environment 2100. For example, moving first cradle 2104 in at least one of an x direction or a y direction along a floor of aircraft manufacturing environment 2100 may also move first fuselage section 2118 in the same at least one of x direction or y direction as first cradle 2104. Holding structure 2200 may move first fuselage section 2118 vertically relative to the floor of aircraft manufacturing environment 2100.

Figure 24:
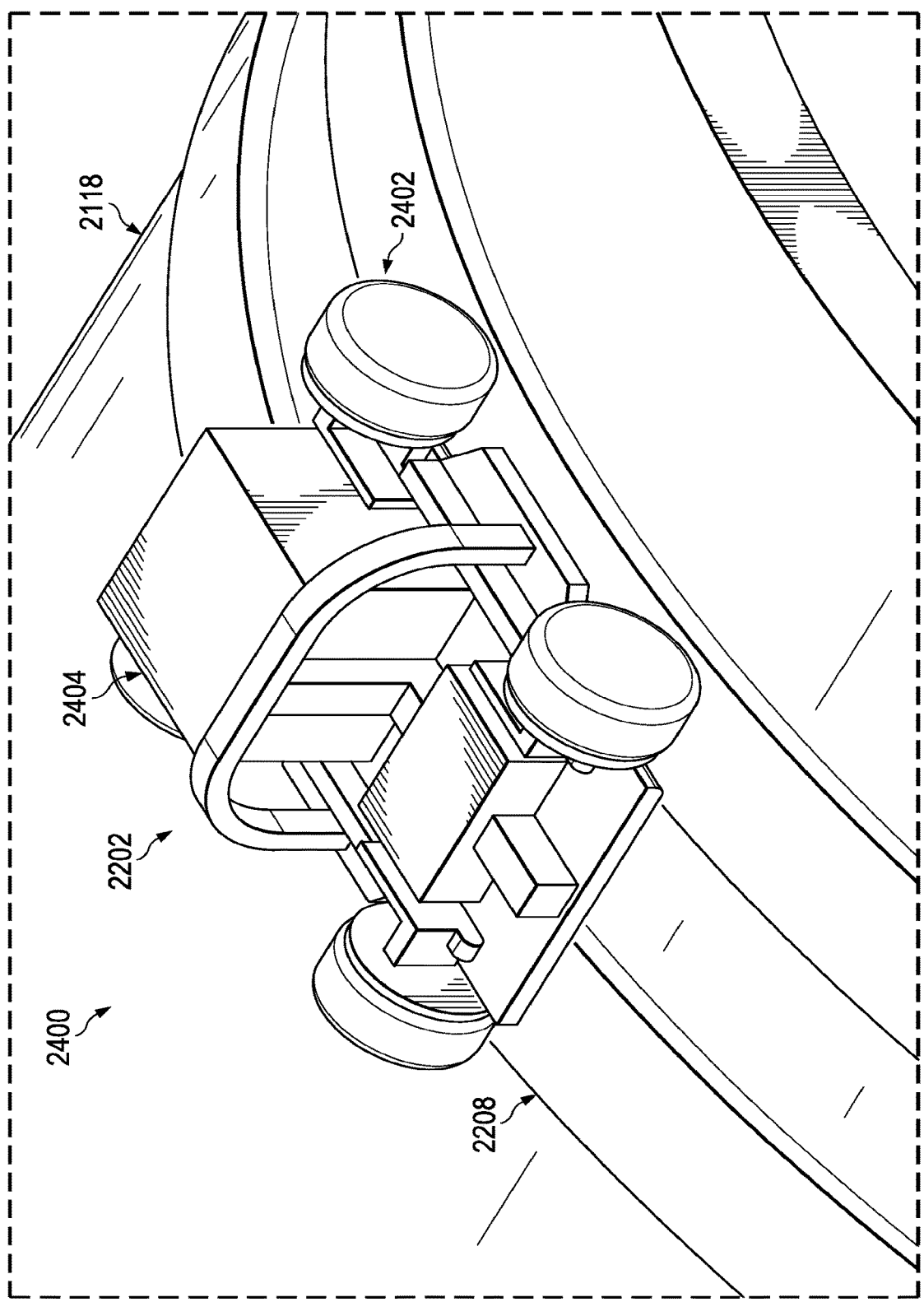
FIG. 24 is an illustration of a robotic assembly in a fuselage manufacturing system in accordance with an illustrative embodiment.

As depicted, weight system 2113 includes first robotic assembly 2202, second robotic assembly 2204, and third robotic assembly 2206. First robotic assembly 2202, second robotic assembly 2204, and third robotic assembly 2206 may be a physical implementation of number of robotic assemblies 2002. For example, first robotic assembly 2202 may be a physical implementation of first robotic assembly 2004. First robotic assembly 2202, second robotic assembly 2204, and third robotic assembly 2206 may travel on track 2208. While held on holding structure 2200, weight system 2113 may apply forces to first fuselage section 2118 to change the current shape of first fuselage section 2118 towards a desired shape for first fuselage section 2118. First robotic assembly 2202, second robotic assembly 2204, and third robotic assembly 2206 may move along the surface of first fuselage section 2118 to apply desired forces to first fuselage section 2118. In this particular example, the forces are applied to first half 2210 of first fuselage section 2118 resting on holding structure 2200. A more detailed illustration of first robotic assembly 2202 is shown in FIG. 24 below.

Figure 23:
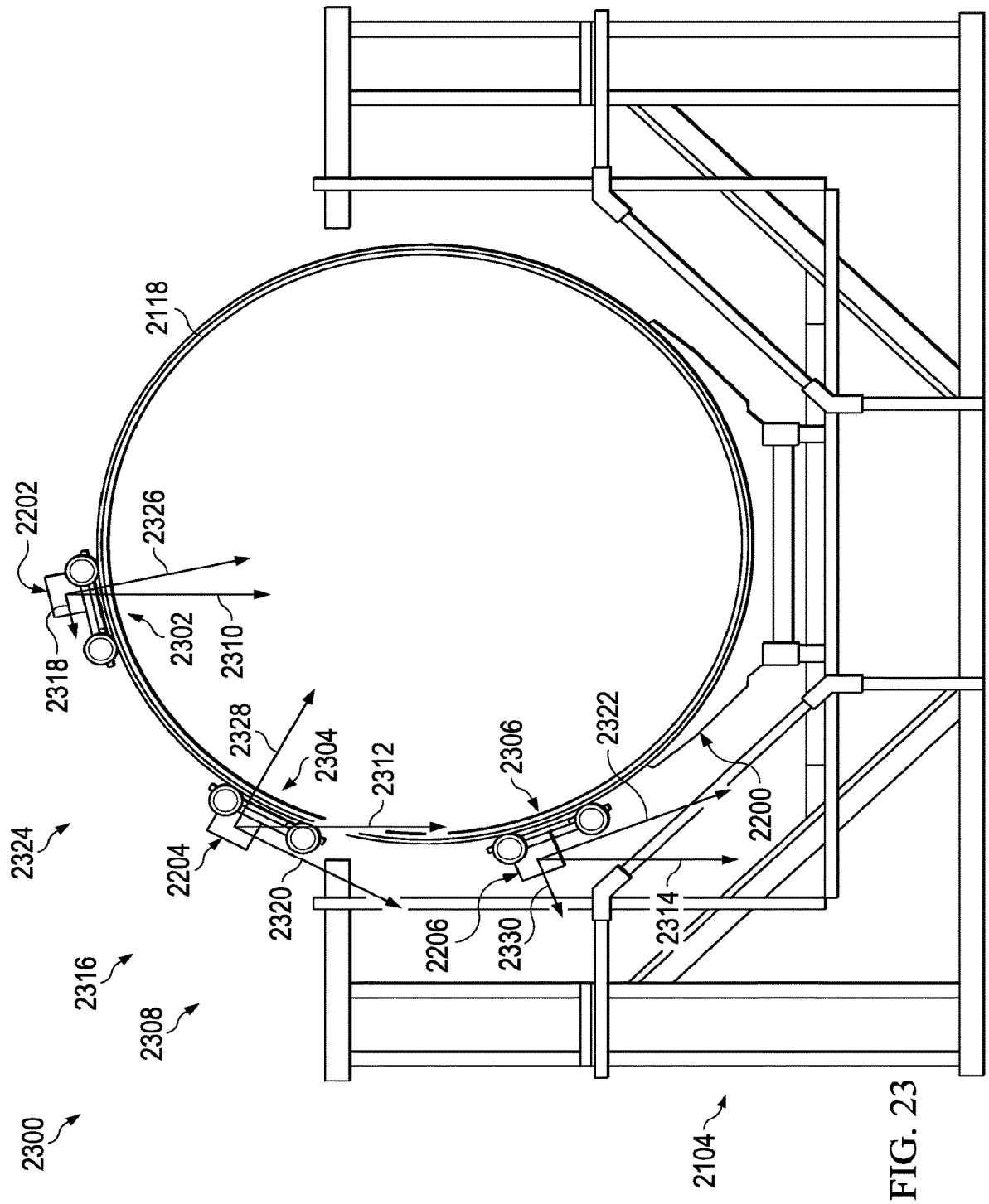
FIG. 23 is an illustration of a front view of a weight system and a fuselage section in a fuselage manufacturing system in accordance with an illustrative embodiment.

Turning now to FIG. 23, an illustration of a front view of a weight system and a fuselage section in a fuselage manufacturing system is depicted in accordance with an illustrative embodiment. View 2300 may be a front view of first fuselage section 2118. In view 2300, first robotic assembly 2202 is at first location 2302. In view 2300, second robotic assembly 2204 is at second location 2304. In view 2300, third robotic assembly 2206 is at third location 2306. First location 2302, second location 2304, and third location 2306 may be physical implementations of locations 2003 of FIG. 20.

In view 2300, gravitational forces 2308 acting on each of first robotic assembly 2202, second robotic assembly 2204, and third robotic assembly 2206 are depicted. Gravitational forces 2308 may include first gravitational force 2310, second gravitational force 2312, and third gravitational force 2314. Each of first gravitational force 2310, second gravitational force 2312, and third gravitational force 2314 may be a representation of the effect of gravity on a respective robotic assembly. For example, first gravitational force 2310 may be a representation of the force of gravity on first robotic assembly 2202. Second gravitational force 2312 may be a representation of the force of gravity on second robotic assembly 2204. Third gravitational force 2314 may be a representation of the force of gravity on third robotic assembly 2206.

Further, tangential forces 2316 acting on first fuselage section 2118 are also depicted. Tangential forces 2316 may be an implementation of forces 114 of FIG. 1 or forces 210 of FIG. 2. Fuselage forces 2316 may include first tangential force 2318, second tangential force 2320, and third tangential force 2322. First tangential force 2318 may be applied at first location 2302. The value of first tangential force 2318 may be dependent on the weight of first robotic assembly 2202. Second fuselage force 2320 may be applied at second location 2304. The value of second tangential force 2320 may be dependent on the weight of second robotic assembly 2204. Third fuselage force 2322 may be applied at third location 2306. The value of third tangential force 2322 may be dependent on the weight of third robotic assembly 2206. Tangential forces 2316 may be changed by changing at least one of first location 2302, second location 2304, third location 2306, the weight of first robotic assembly 2202, the weight of second robotic assembly 2204, the weight of third robotic assembly 2206, or the number of robotic assemblies on first fuselage section 2118.

Yet further, normal forces 2324 acting on first fuselage section 2118 are also depicted. Normal forces 2324 may be an implementation of forces 114 of FIG. 1 or forces 210 of FIG. 2. Normal forces 2324 may include first normal force 2326, second normal force 2328, and third normal force 2330. First normal force 2326 may be applied at first location 2302. The value of first normal force 2326 may be dependent on the weight of first robotic assembly 2202. Second fuselage force 2328 may be applied at second location 2304. The value of second normal force 2328 may be dependent on the weight of second robotic assembly 2204. Third fuselage force 2330 may be applied at third location 2306. The value of third normal force 2330 may be dependent on the weight of third robotic assembly 2206. Normal forces 2324 may be changed by changing at least one of first location 2302, second location 2304, third location 2306, the weight of first robotic assembly 2202, the weight of second robotic assembly 2204, the weight of third robotic assembly 2206, or the number of robotic assemblies on first fuselage section 2118.

Turning now to FIG. 24, an illustration of a robotic assembly in a fuselage manufacturing system is depicted in accordance with an illustrative embodiment. View 2400 is a view of first robotic assembly 2202 of FIG. 22. As depicted, first robotic assembly 2202 has number of wheels 2402. First robotic assembly 2202 may travel across the surface of first fuselage section 2118 using number of wheels 2402. As depicted, number of wheels 2402 may be used with track 2208.

In this illustrative example, first robotic assembly 2202 may have a number of discrete weights. For example, first robotic assembly 2202 has square weights 2404.

Figure 25:
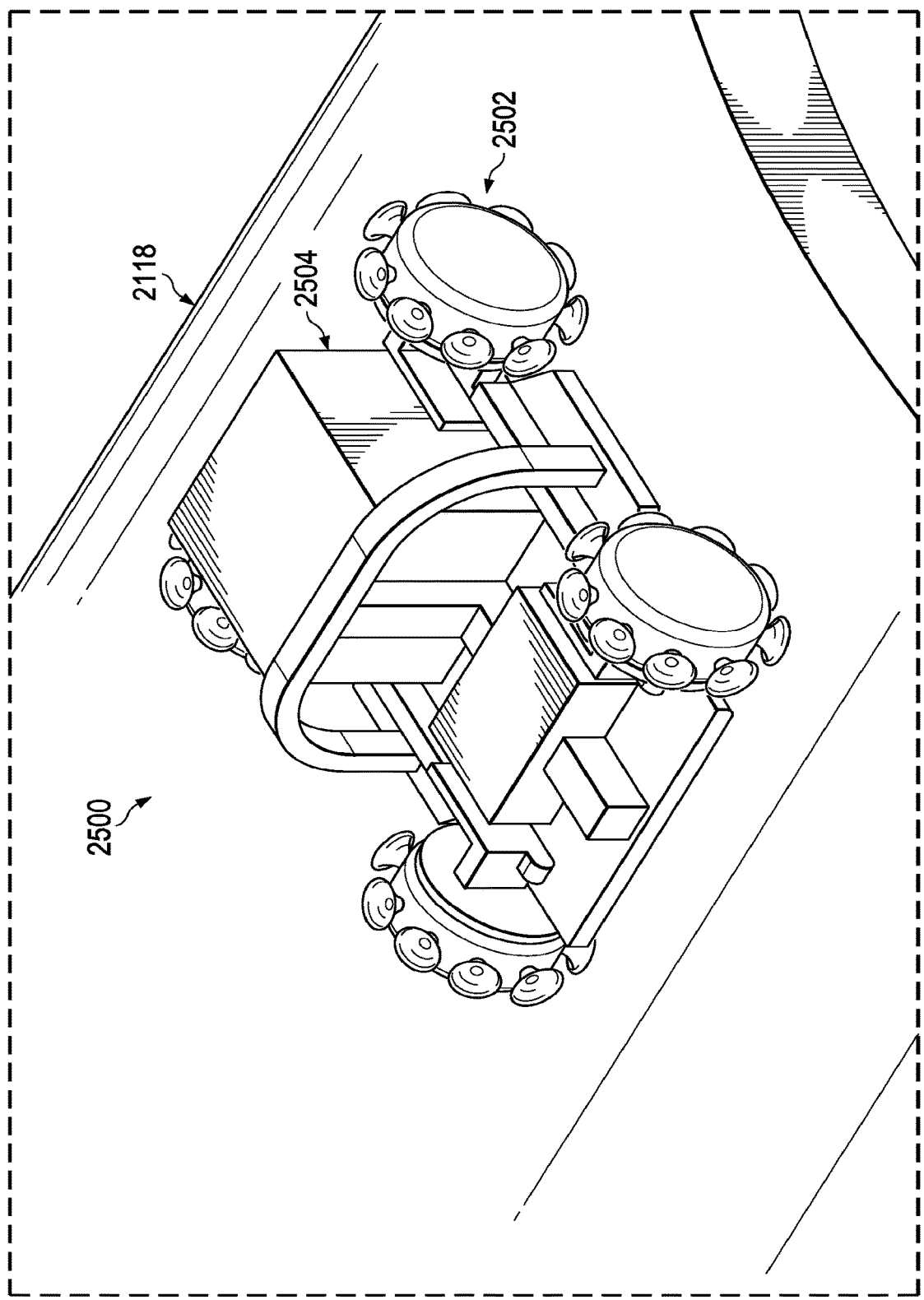
FIG. 25 is an illustration of a robotic assembly in a fuselage manufacturing system in accordance with an illustrative embodiment.

Turning now to FIG. 25, an illustration of a robotic assembly in a fuselage manufacturing system is depicted in accordance with an illustrative embodiment. Robotic assembly 2500 may be an alternative implementation of first robotic assembly 2202 of FIG. 22. In this illustrative example, robotic assembly 2500 has suction cups 2502 rather than track 2208 as depicted in FIG. 24. Suction cups 2502 may be an alternative to number of wheels 2402 of FIG. 24. Suction cups 2502 may allow robotic assembly 2500 to traverse the surface of first fuselage section 2118 in any direction. Suction cups 2502 may allow robotic assembly 2500 to traverse all of first fuselage section 2118 without the use of track 2208 (not depicted in FIG. 25). In this illustrative example, robotic assembly 2500 may have a number of discrete weights. For example, robotic assembly 2500 has square weights 2504.

Figure 26:
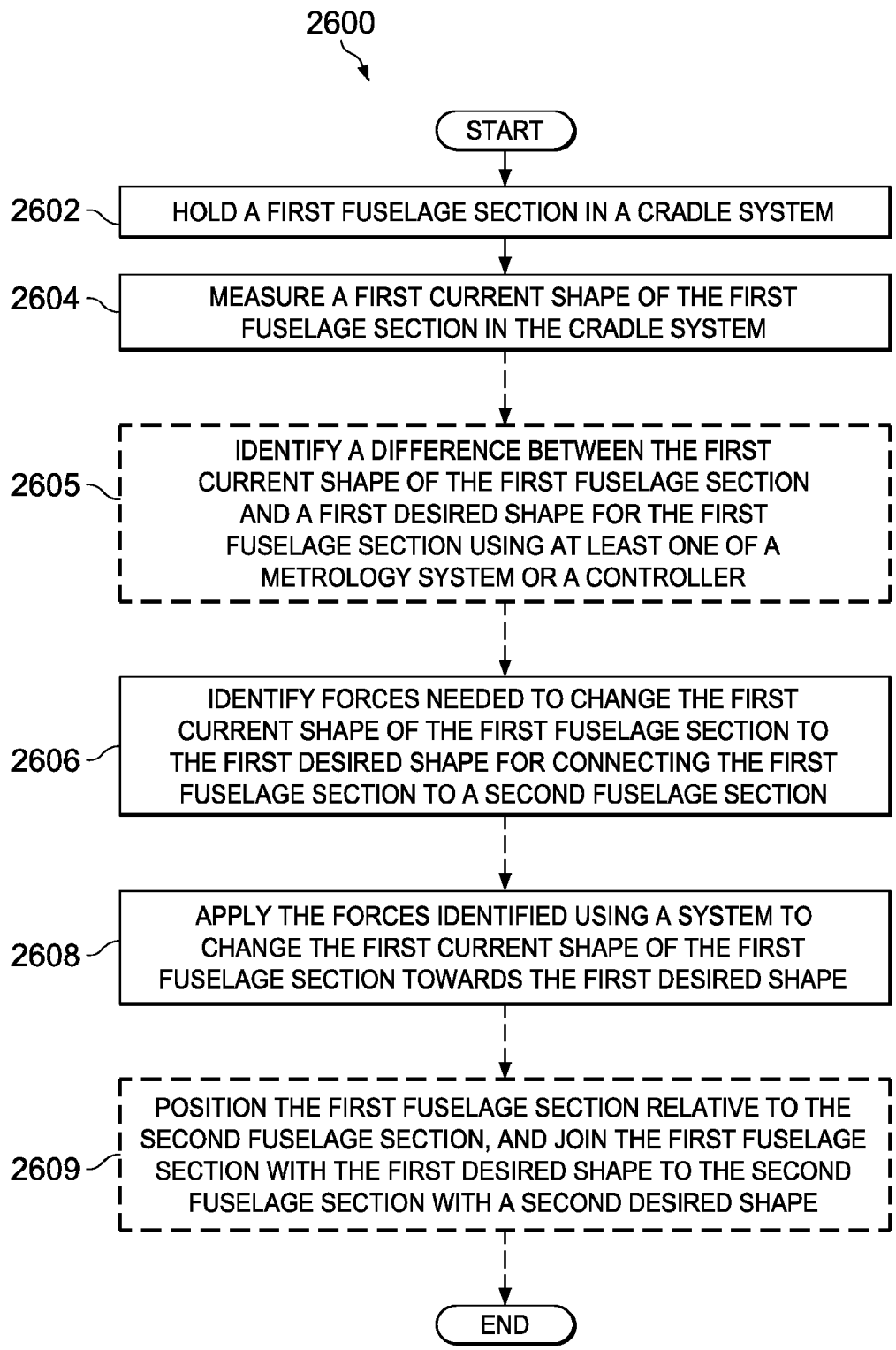
FIG. 26 is an illustration of a flowchart of a process for joining fuselage sections in accordance with an illustrative embodiment.

Turning now to FIG. 26, an illustration of a flowchart of a process for joining fuselage sections is depicted in accordance with an illustrative embodiment. The process in FIG. 26 may be implemented in aircraft manufacturing environment 100 to process fuselage sections 103. In particular, the different operations may be implemented using fuselage manufacturing system 102 in FIG. 1.

Process 2600 begins by holding a first fuselage section 104 in a cradle system 108 (operation 2602). Process 2600 then measures a first current shape 116 of the first fuselage section 104 in the cradle system 108 (operation 2604). In some illustrative examples, the measuring step is performed using an optical metrology system 110 and includes at least one of a LIDAR system or a laser scanning system. In some illustrative examples, process 2600 may further comprise identifying a difference between the first current shape 116 of the first fuselage section 104 and a first desired shape 120 for the first fuselage section 104 using at least one of a metrology system 110 or a controller 112 (optional operation 2605).

Process 2600 identifies the forces to change the current shape of the first fuselage section to a desired shape for connecting the first fuselage section to a second fuselage section (operation 2606). In identifying the forces, process 2600 may identify a difference between the first current shape 116 of the first fuselage section 104 and the first desired shape 120 for the first fuselage section 104 using at least one of a metrology system 110 or a controller 112. This difference may then be used to identify forces 114 to make a change in the shape of the first fuselage section 104. In some illustrative examples, the first desired shape 120 is based on at least one of the first current shape 116 of the first fuselage section 104 and a second current shape 124 of the second fuselage section 106, or parameters specified by a design for the first fuselage section 104. In some illustrative examples, the first current shape 116 and the first desired shape 120 are contours 121 for the first fuselage section 104.

In some illustrative examples, identifying forces 114 to change the first current shape 116 of the first fuselage section 104 to the first desired shape 120 for connecting the first fuselage section 104 to the second fuselage section 106 further comprises identifying locations 220 or 2003 on a circumference 122 of the first fuselage section 104 to apply the forces 114.

Process 2600 then applies the forces 114 identified using the weight system 2000 to change the first current shape 116 of the first fuselage section 104 towards the first desired shape 120 (operation 2608). In some illustrative examples, applying the forces 114 identified comprises moving a number of robotic assemblies 2002 of the weight system 2000 along a surface of the first fuselage section 104 to a first number of locations 2003 on the surface.

In some illustrative examples, process 2600 may further comprise positioning the first fuselage section 104 relative to the second fuselage section 106, and joining the first fuselage section 104 with a first desired shape 120 to the second fuselage section 106 with a second desired shape 126 (optional operation 2609). Afterwards the process terminates. In some illustrative examples, the joining step forms at least one of a butt joint or a splice joint.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, process 2600 may further comprise repeating the measuring step (operation 2604), the identifying step (operation 2606), and the applying step (operation 2608) until the first current shape 116 of the first fuselage section 104 reaches the first desired shape 120 of the first fuselage section 104. In some illustrative examples, process 2600 may further comprise telescoping a first robotic assembly 2004 from the first fuselage section 104. In some illustrative examples, process 2600 may further comprise adding a weight 2027 to a robotic assembly 2004 of the weight system 2000.

In some illustrative examples, the current shape is first current shape 116 and the desired shape is first desired shape 120. In these illustrative examples, process 2600 may further comprise measuring a second current shape 124 of the second fuselage section 106. In these illustrative examples, identifying the forces 114 to change the first current shape 116 of the first fuselage section 104 towards the first desired shape 120 for connecting the first fuselage section 104 to the second fuselage section 106 comprises identifying the forces 114 to change at least one of the first current shape 116 of the first fuselage section 104 towards the first desired shape 120 or the second current shape 124 of the second fuselage section 106 to a second desired shape 126 for connecting the first fuselage section 104 to the second fuselage section 106.

In these illustrative examples, applying the forces 114 identified using the system to change the current shape of the first fuselage section towards the desired shape comprises: applying the forces to change at least one of the first current shape of the first fuselage section towards the first desired shape or the second current shape of the second fuselage section toward the second desired shape.

In some illustrative examples, process 2600 may further comprise repeating the measuring step (operation 2604), the identifying step (operation 2606), and the applying step (operation 2608) until the second current shape 124 of the second fuselage section 106 reaches the second desired shape 126 of the second fuselage section 106. Repeating the applying step (operation 2608) comprises moving the number of robotic assemblies 2002 of the system from the first number of locations 2028 to a second number of locations 2030.

Thus, one or more of the illustrative embodiments provide a method and apparatus for processing fuselage sections to form the fuselage for an aircraft. In one illustrative example, an apparatus includes a cradle system, a metrology system, a controller, and a weight system. The weight system applies forces to the fuselage section to change the current shape of the fuselage section by moving across the surface of the fuselage section. The metrology system makes measurements of the current shape of the fuselage section. The controller receives measurements from the metrology system and identifies the forces to change the current shape of the fuselage section towards a desired shape for the fuselage section. This desired shape is one that may be used to connect the fuselage section to another fuselage section.

With the apparatus in the different processes performed, joining fuselage sections may be performed more easily and with less labor cost as compared to currently used techniques. Further, with the apparatus in the different processes performed, joining fuselage sections may be performed with at least one of a smaller apparatus, or a lighter apparatus. A smaller apparatus may take up less space of a manufacturing environment. A lighter apparatus may put less weight on a floor of a manufacturing environment.

With an illustrative example, the fuselage section may be changed using a feedback loop to reach a desired shape for the fuselage section. Further, the number of human operators needed to perform the changes of measurements is fewer than those currently available systems for joining fuselage sections. In this manner, an illustrative example may provide for a better fit between fuselage sections, the reduction in cost in joining fuselage sections, reduced amounts of labor needed to join fuselage sections, reduced amount of manufacturing environment space consumed by an apparatus, reduced amount of weight on a floor of a manufacturing environment, or some combination thereof.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for changing a shape of a fuselage of an aircraft, the system comprising:
    the fuselage disposed in a frame; and
    a weight system comprising a plurality of robots disposed at selected locations around a surface of the fuselage, wherein the plurality of robots are configured to traverse the surface of the fuselage, wherein each of the plurality of robots comprises a weight, and wherein each of the plurality of robots is assigned to a corresponding position on the surface of the fuselage such that, when the plurality of robots are in the assigned corresponding positions, gravity acting on the plurality of robots creates forces that alter the shape of the fuselage to a predetermined amount.

2. The system of claim 1 further comprising:
a metrology system configured to make measurements of the shape of the fuselage.

3. The system of claim 2 further comprising a controller configured to receive the measurements, to identify the forces needed to change the shape towards a desired shape, and to command the plurality of robots to move to the assigned corresponding positions.

4. The system of claim 3, wherein the plurality of robots is arranged circumferentially around the fuselage.

5. The system of claim 3, wherein:
the metrology system is configured to make new measurements of a current shape of the fuselage after the forces alter the shape of the fuselage; and
the controller is configured to use the new measurements as a feedback to identify second forces needed to change the current shape towards the desired shape and to command the plurality of robots to new assigned corresponding positions.

6. The system of claim 1, wherein the frame comprises a cradle configured to hold the fuselage of the aircraft.

7. The system of claim 1, wherein each weight of each of the plurality of robots is tailored to generate a desired force on the fuselage of the aircraft.

8. The system of claim 1, wherein the weight system further comprises a track attached to the fuselage and wherein the plurality of robots are connected to the track.

9. The system of claim 1, wherein the weight system applies the forces along a circumference of the fuselage.

10. The system of claim 1, wherein each of the plurality of robots further comprises a corresponding plurality of wheels from which extends a corresponding plurality of suction cups.

11. A method of using a system for changing a shape of a fuselage of an aircraft, the system comprising a weight system comprising a plurality of robots disposed at selected locations around a surface of the fuselage, wherein the plurality of robots are configured to traverse the surface of the fuselage, wherein each of the plurality of robots comprises a weight, and wherein the method comprises:
moving each of the plurality of robots independently to an assigned corresponding position on the surface of the fuselage such that, when the plurality of robots are in the assigned corresponding positions, gravity acting on the plurality of robots creates forces that alter the shape of the fuselage to a predetermined amount.

12. The method of claim 11, wherein the system further includes a metrology system configured to make measurements of the shape of the fuselage and a controller configured to receive the measurements, to identify the forces needed to change the shape towards a desired shape, and to command the plurality of robots to move to the assigned corresponding positions, and wherein the method further comprises:
making the measurements of the shape of the fuselage;
identifying the forces needed to change the shape towards the desired shape; and
commanding the plurality of robots to move to the assigned corresponding positions.

13. The method of claim 12, further comprising repeating the making the measurements step, the identifying step, and the commanding step until a current shape of the fuselage reaches the desired shape.

14. The method of claim 11, further comprising changing the weight of one or more of the plurality robots to tailor a desired force on the fuselage of the aircraft.

15. The method of claim 11, wherein each of the plurality of robots move to the assigned corresponding positions on a track attached to the fuselage.

16. The method of claim 11, wherein each of the plurality of robots move to the assigned corresponding positions on a corresponding plurality of suction cups extending from a corresponding plurality of wheels.

17. The method of claim 11, wherein the weight system applies the forces along a circumference of the fuselage.

18. A weight system for changing a shape of a fuselage of an aircraft, the weight system comprising:
a plurality of robots disposed around a surface of the fuselage and configured to traverse the surface of the fuselage;
a weight attached to each robot of the plurality of robots;
wherein each robot of the plurality of robots is assigned to a corresponding position on the surface of the fuselage and gravity acting on the plurality of robots creates forces that alter the shape of the fuselage to a desired shape.

19. The system of claim 18 further comprising:
a metrology system configured to make measurements of the shape of the fuselage.

20. The system of claim 19 further comprising a controller configured to receive the measurements, to identify the forces needed to change the shape towards the desired shape, and to command the plurality of robots to move to the assigned corresponding positions.

* * * * *